US010541915B2

(12) United States Patent
Ryan et al.

(10) Patent No.: US 10,541,915 B2
(45) Date of Patent: Jan. 21, 2020

(54) TECHNIQUES FOR ROUTING PACKETS WITHIN AN EVOLVED PACKET CORE

(71) Applicant: INTEL CORPORATION, Santa Clara, CA (US)

(72) Inventors: Brendan N. Ryan, Limerick (IE); Chris Macnamara, Limerick (IE)

(73) Assignee: INTEL CORPORATION, Santa Clara, CA (US)

(*) Notice: Subject to any disclaimer, the term of this patent is extended or adjusted under 35 U.S.C. 154(b) by 53 days.

(21) Appl. No.: 14/671,126

(22) Filed: Mar. 27, 2015

(65) Prior Publication Data
US 2016/0285759 A1    Sep. 29, 2016

(51) Int. Cl.
*H04L 12/741* (2013.01)
*H04L 12/931* (2013.01)
*H04L 29/06* (2006.01)
*H04W 4/24* (2018.01)
*H04M 15/00* (2006.01)

(52) U.S. Cl.
CPC .............. *H04L 45/74* (2013.01); *H04L 49/70* (2013.01); *H04L 69/22* (2013.01); *H04M 15/66* (2013.01); *H04W 4/24* (2013.01)

(58) Field of Classification Search
CPC ....... H04L 45/74; H04L 49/70; H04L 49/355; H04L 69/22; H04W 4/24; H04M 15/66
See application file for complete search history.

(56) References Cited

U.S. PATENT DOCUMENTS

| 8,625,588 | B2* | 1/2014 | Shake | H04L 1/08 370/389 |
| 2009/0327112 | A1* | 12/2009 | Li | G06Q 30/0283 705/34 |
| 2013/0325983 | A1* | 12/2013 | Brady | H04L 51/38 709/206 |
| 2014/0040488 | A1* | 2/2014 | Small | H04L 67/143 709/228 |
| 2015/0280926 | A1* | 10/2015 | Yamada | H04L 12/1407 370/259 |
| 2016/0135016 | A1* | 5/2016 | Zou | H04W 4/06 370/312 |

* cited by examiner

*Primary Examiner* — Kevin C. Harper
*Assistant Examiner* — Henry Baron

(57) ABSTRACT

Various embodiments are generally directed to techniques for improving the routing of control messages among components of a wireless communications system to control the provision of communications services to endpoint devices within a wireless network. An apparatus may include an interface to the network; a virtual switch to retrieve a device identifier of an endpoint device from a payload of a packet and to select a PCRF component to which to route the packet based on the device identifier, the endpoint device coupled to the network; and the selected PCRF component to grant a data session to the endpoint device based on an indication of a request by the endpoint device for the data session conveyed in the payload, the data session comprising an exchange of data between the endpoint device and the interface device through the network. Other embodiments are described and claimed.

25 Claims, 11 Drawing Sheets

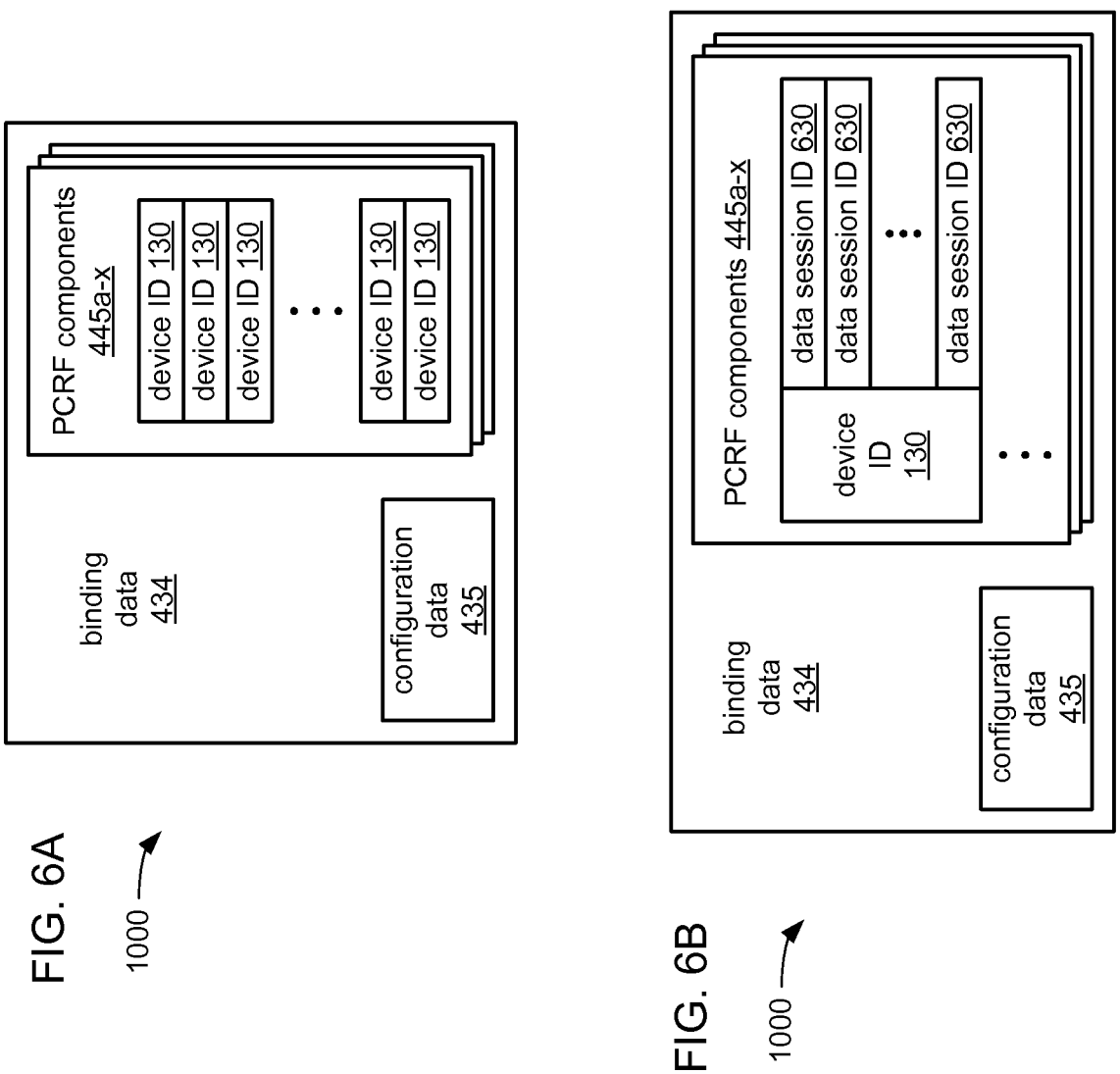

TECHNIQUES FOR ROUTING PACKETS
WITHIN AN EVOLVED PACKET CORE

BACKGROUND

Various network protocols have been used in communications among components of wireless communications systems to exchange information concerning authentication of users, routing of user data, quality of service (QoS), and charging for use of communications based on time, amount of data transferred, etc. For some time, the Remote Authentication Dial In User Service (RADIUS) protocol, adopted and promulgated by the Internet Engineering Task Force (IETF) of the Internet Society (ISOC) of Reston, Va. (becoming IETF 2000, RFC 2865, Remote Authentication Dial In User Service), was widely adopted and used. However, as both the complexity and bandwidth requirements of cellular communications have increased, various limitations of the RADIUS protocol have become more and more of an issue.

The Diameter protocol, also adopted and promulgated by IETF (becoming IETF 2003, RFC 3588, Diameter Base Protocol, and IETF 2003, RFC 4006 Diameter Credit-Control Application), was developed to replace the RADIUS protocol using many of the lessons learned from years of experience in using the RADIUS protocol. The Diameter protocol provides better security and a more flexible set of standardized messages, as well as incorporating better support for protocol extensions to better accommodate future developments. The Diameter protocol has, as its creators intended, begun to largely supplant the RADIUS protocol in communications between components of wireless communications systems.

Unfortunately, the increased flexibility of the Diameter protocol is accompanied by greater complexity in the formation, transmission and interpretation of the control messages that adhere to the Diameter protocol. As a result, use of the Diameter protocol may increase processing requirements and/or the volume of control messages exchanged between components of a wireless communications system.

BRIEF DESCRIPTION OF THE DRAWINGS

FIGS. 6A and 6B each illustrate an example embodiment of binding data to bind packets conveying control messages to a PCRF component.

DETAILED DESCRIPTION

Figure 1:
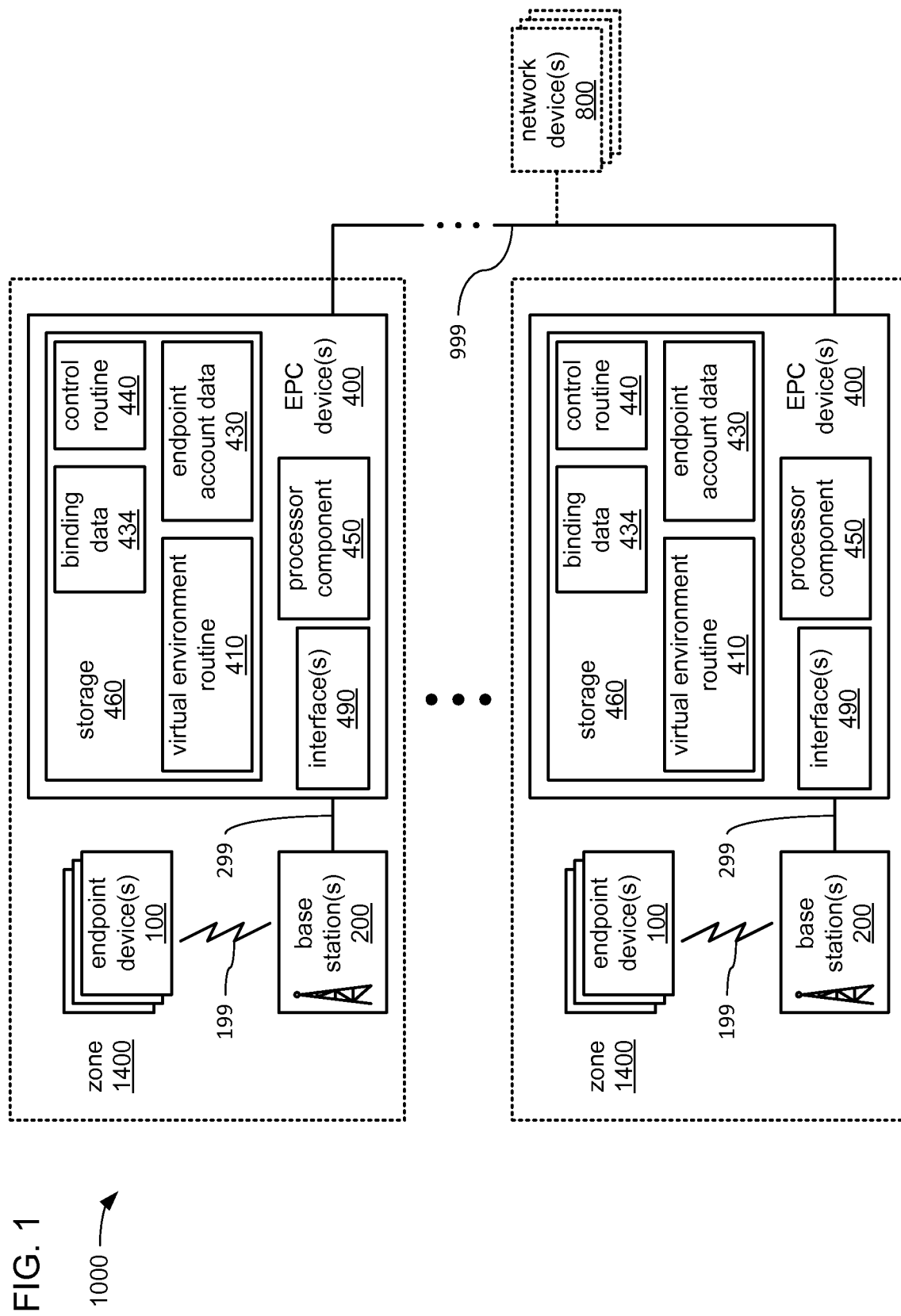
FIGS. 1 and 2 illustrate an example embodiment of a wireless communications system.

Various embodiments are generally directed to techniques for improving the routing of control messages among components of a wireless communications system to control the provision of communications services to endpoint devices within a wireless cellular network. Within an evolved packet core (EPC) device, a virtual switch that is executed within a hypervisor to route packets conveying control messages among multiple components executed within virtual machines (VMs) managed by the hypervisor may be augmented with higher level routing features to reduce the overall number of packets exchanged among the VMs. Among such higher level routing features may be the inspection of payloads in packets that adhere to the Diameter protocol and other routing features of a Diameter Routing Agent (DRA).

A wireless communications system may provide a wireless cellular network to endpoint devices across a relatively wide geographic region in a manner that is divided into one or more zones and/or into multiple cells. The endpoint devices may be any of a variety of types of wireless communications devices capable of wireless cellular communications, including and not limited to, cellular telephones, smart phones, tablet devices, netbook devices, notebook computers, desktop computers, wireless repeater devices, wireless access points, wireless communications dongles for attachment to other devices, etc. The wireless communications may include voice, still images, video, documents, spreadsheets, portions of databases, etc.

To provide the wireless cellular network across a relatively wide geographic region, the wireless communications system may incorporate multiple geographically dispersed base stations that each include a transceiver and antenna to provide a cell that covers a portion of the geographic region. Multiple ones of the base stations providing wireless cellular communications across multiple cells in a zone may be coupled to an EPC device that may be accompanied by at least one redundant EPC device. Within the EPC device, multiple components of the wireless communications system may be executed within separate VMs provided by a virtual environment routine. The virtual environment routine may also be executed to perform various hypervisor functions to oversee the operation of the other VMs. Among those hypervisor functions may be to provide a virtual switch that serves as a virtual analog to a network switch device by which the components executed within each of the VMs may be given access to a physical network interface of the EPC.

The use of a single EPC device in which multiple VMs are provided may be an alternative to the use of an EPC made up of multiple separate computing devices, each of which may execute a separate one of various components of the cellular communications network, and which may be coupled through a physical network switch device. Improvements in processor components may make such use of a single EPC device in which multiple VMs are provided more cost effective and/or more energy efficient than an EPC made up of multiple separate computing devices.

One of the components of the cellular communications network that may be ported from execution within a physically distinct computing device to execution within an EPC device providing multiple VMs may be a routing agent, and the routing agent may be a DRA to route Diameter packets based at least partially on the contents of their payloads. With each of multiple components of the wireless communications system executed within separate computing devices coupled through a physical network switch device, a relatively high volume of network traffic may be generated through that network switch device between the computing device on which the routing agent is executed and others of the computing devices on which others of the components are executed. However, it may be deemed acceptable to allow such a volume of network traffic through that network switch device and/or to select a physical network switch device with sufficient capacity to accommodate that network traffic.

However, with each of the same multiple components of the wireless communications system, including with routing agent, ported to be executed within separate VMs of multiple VMs provided within a single EPC device, such a relatively high volume of network traffic through a virtual switch that takes over for the physical network switch device may not be deemed acceptable. Where a single EPC device provides multiple VMs within which various components of the wireless communications system are separately executed, the processor component(s) of the single EPC device may need to perform frequent context switches to jump among executing each of various components within various VMs, as well as jumping in and out of executing a portion of the virtual environment routine to perform various hypervisor functions, including the virtual switch. As recognizable to those skilled in the art, such frequent context switching may make relatively inefficient use of processing resources, and therefore, it may be deemed desirable to minimize how often context switching occurs where possible.

The virtual environment routine may make use of various techniques to minimize the negative effects of frequent context switches on the efficiency with which processing resources are used. However, the relatively high volume of network traffic through the virtual switch between the routing agent and other components of the wireless communications system that are each executed in separate VMs may force even more frequent context switching that may overcome the capabilities of such techniques and lead to a considerably more inefficient use of processing resources. More specifically, each exchange of a control message between two components of the wireless communications system through the virtual switch may necessitate at least a first context switch from the component that transmits the control message and to the virtual switch that receives the control message, and then a second context switch from the virtual switch after re-transmitting the control message and to the other component that receives the control message as re-transmitted. Thus, where both the source and destination components of a control message are executed within separate VMs, and where the virtual switch is executed as part of the functions provided by the virtual environment routine, every exchange of a control message between the source and destination component may require a minimum of two context switches performed in relatively quick succession.

To minimize the losses in efficiency in using processing resources that may arise from such frequent use of context switching and/or other undesirable effects of a relatively high volume of such network traffic, the virtual switch may be augmented with features of the routing agent such that the virtual switch may, itself, perform the functions of the routing agent. This may eliminate the need for such a high volume of network traffic between the virtual switch provided as a hypervisor function of the virtual environment routine and a separate VM in which the routing agent may otherwise be executed. Upon receipt of a packet, the virtual switch may first analyze the header of the packet to determine whether the packet is a control packet. If not, then the virtual switch may route the packet towards a destination based on an Internet Protocol (IP) address or other indication of the destination included in the header of the packet. Such routing may be regarded as a routing function performed at Layer 3 of the seven layers of the Open Systems Interconnect (OSI) Reference Model promulgated by the International Organization for Standardization (ISO) of Geneva Switzerland for use in categorizing the activity of devices on a network. In so routing a packet determined to not be a control packet, the virtual switch may refrain from inspecting the payload of that packet, thereby increasing the speed at which such packets may be routed.

However, if the received packet received is a packet conveying a control message, then the virtual switch may employ the routing agent functionality with which the virtual switch has been augmented to analyze a portion of the payload of the packet to determine the type of control message that is conveyed within that packet. Again, in some embodiments, packets conveying control messages may be Diameter packets that adhere to the Diameter protocol. If the control message is an indication of a request to initiate a data session for an endpoint device through the wireless communications system (e.g., a Diameter "initiate transaction" message), then the virtual switch may select one of multiple Policy and Charging Rules Function (PCRF) components, each of which may be executed within a separate VM of the EPC, to route the control packet to. In so selecting one of the PCRF components, the virtual switch may engage in load balancing the handling of data sessions supported through the wireless communications system among the multiple PCRF components. In so doing, the virtual switch may recurringly exchange packets with each of the PCRF components as part of monitoring the status of each, and may base the selection of a PCRF component to which to transmit the control packet on the indications of status received from each of the PCRF components. Alternatively or additionally, the virtual switch may base that selection on the relative numbers of data sessions currently supported by each of the PCRF components.

However, if the control message conveyed within the received packet is an indication of an update of some aspect of an ongoing data session (e.g., a Diameter "update transaction" message), then the virtual switch may determine which PCRF component is the one to which an earlier control message conveying an indication of a request for initiation of that particular data session was routed, and may route the packet to that same PCRF component. In effect, the virtual switch may enforce a binding of that data session to that particular PCRF in which the virtual switch routes subsequent packets conveying control messages concerning that data session to that particular PCRF for as long as that data session exists. However, in some embodiments, that binding may be extended to include other data sessions that are associated with the same endpoint device such that the virtual switch effectively binds that endpoint to that PCRF component. More specifically, the virtual switch may enforce the binding of any other data session that also involves that same endpoint device to that same PCRF component such that the virtual switch routes packets conveying control messages concerning any data session associated with that same endpoint device to that particular PCRF component. In support of enforcing such bindings, the virtual switch may maintain a data structure of indications (e.g., a table) of what ongoing data sessions and/or what endpoint devices are currently bound to each of the PCRF components. Such an indication of a binding may be added to that data structure when a packet conveying a control message that includes an indication of a request to initiate a data session is routed to a selected one of the PCRF components.

Further, if the control message conveyed within the received packet includes an indication of a request to terminate an ongoing data session (e.g., a Diameter "terminate transaction" message), then the virtual switch may remove an indication of a binding of that current data session from that data structure. In some embodiments in which action is required by a PCRF component as part of or in response to terminating a data session, the virtual switch may route that packet to the PCRF component to which at least that data session is bound. In other embodiments in which no action is required by the PCRF component as part of or in response to terminating a data session, the virtual switch may refrain from routing that packet to any other component within the EPC device.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Figure 2:
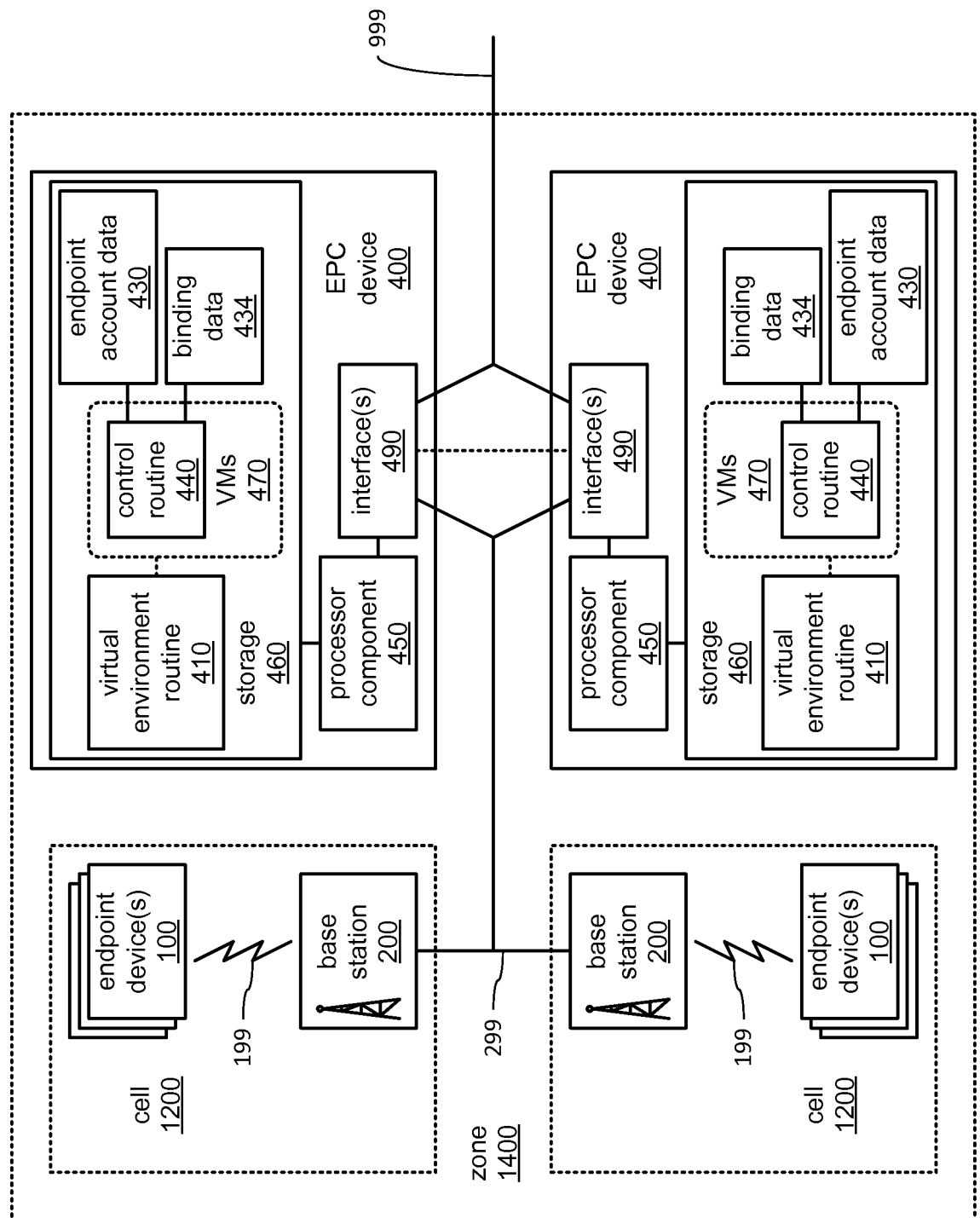

FIGS. 1 and 2 illustrate block diagrams of an embodiment of a wireless communications system 1000 providing a wireless cellular network 199. The wireless cellular network 199 may be provided to enable operators of numerous endpoint devices 100 to engage in communications that may include the exchange of voice, video, still images, documents, portions of databases and/or other forms of data in one or more data sessions among the endpoint devices 100 and/or between endpoint devices 100 and network device 800 that may not be directly coupled to the wireless cellular network 199. The operators of the endpoint devices 100 may be subscribers to the wireless cellular network 199 as a service provided by a corporation or other entity that may own, operate and/or maintain the wireless cellular network 199. The endpoint devices 100 may be any of a wide variety of types of wireless communications device, including and not limited to, cellular telephones, portable computers (e.g., laptop computers, tablet computers, smart phones, etc.), and wireless network interface controllers (NICs) that may be implemented in the form of a "dongle" able to be coupled to another device to provide that other device with access to the wireless cellular network 199.

As depicted in FIG. 1, the wireless cellular network 199 may be divided into multiple zones 1400 that each cover a subset of the relatively wide geographic region covered by the wireless cellular network 199. In embodiments of the wireless communications system 1000 in which there is more than one zone 1400, the multiple zones 1400 may be coupled to each other through a network 999. The network 999 may include a wired and/or wireless network dedicated to the function of coupling multiple zones 1400, and may employ dedicated line-of-sight microwave communications linkages among towers arranged along rights of way formed on land, and/or line-of-sight wireless communications relayed between locations on land by one or more satellites. Alternatively or additionally, at least a portion of the network 999 may be routed through and/or otherwise include the Internet, and the network device(s) 800 with which operators of the endpoint devices 100 may engage in communications may also be coupled to the multiple zones 1400 through the network 999.

As depicted in FIG. 2, each of the one or more zones 1400 may be divided into numerous cells 1200. Each cell 1200 may be at least partially defined by the wireless transmission and reception range limits of an antenna and a transceiver (not shown) of a base station 200. As may be familiar to those skilled in the art, the division of a wireless network into cells that are each based on a separate base station distributed throughout the geographic area covered by that wireless network enables the use of the same radio frequencies at multiple locations within the geographic area in a coordinated manner that increases the available capacity for wireless communications traffic while avoiding instances of interference. Thus, each cell 1200 may incorporate at least one base station 200 to provide a portion of the wireless cellular network 199 within that cell 1200, and one or more endpoint devices 100 to engage in wireless communications with the at least one base station 200 within that cell 1200 through the portion of the wireless cellular network 199 provided therein.

Referring to both FIGS. 1 and 2, each of the one or more zones 1400 may incorporate multiple ones of the base stations 200 generating multiple ones of the cells 1200 to accommodate use of the wireless cellular network 199 by numerous ones of the endpoint devices 100. Each zone 1400 may also incorporate one or more EPC devices 400 to which the base stations 200 of that zone 1400 may be coupled by a base station network 299. In each zone 1400, it may be the one or more EPC devices 400 that couples that zone 1400 to the network 999, thereby enabling communications between an endpoint device 100 within that zone 1400 and either another endpoint device 100 within a different zone 1400 or a network device 800 coupled to the network 999. As more specifically depicted in FIG. 2, each of the one or more zones 1400 may incorporate more than one of the EPC devices 400 coupled in a manner enabling the sharing of information from one to another as part of enabling the other to serve as a back up EPC device 400 to address device failures.

In various embodiments, each EPC device 400 may incorporate one or more of a processor component 450, a storage 460 and one or more an interfaces 490 to couple the EPC device 400 to the base station network 299 and/or to the network 999. The storage 460 may store one or more of a virtual environment routine 410, a control routine 440, endpoint account data 430 and binding data 434. Each of the virtual environment routine 410 and the control routine 440 may incorporate a sequence of instructions operative on the processor component 450 to implement logic to perform various functions.

Figure 3:
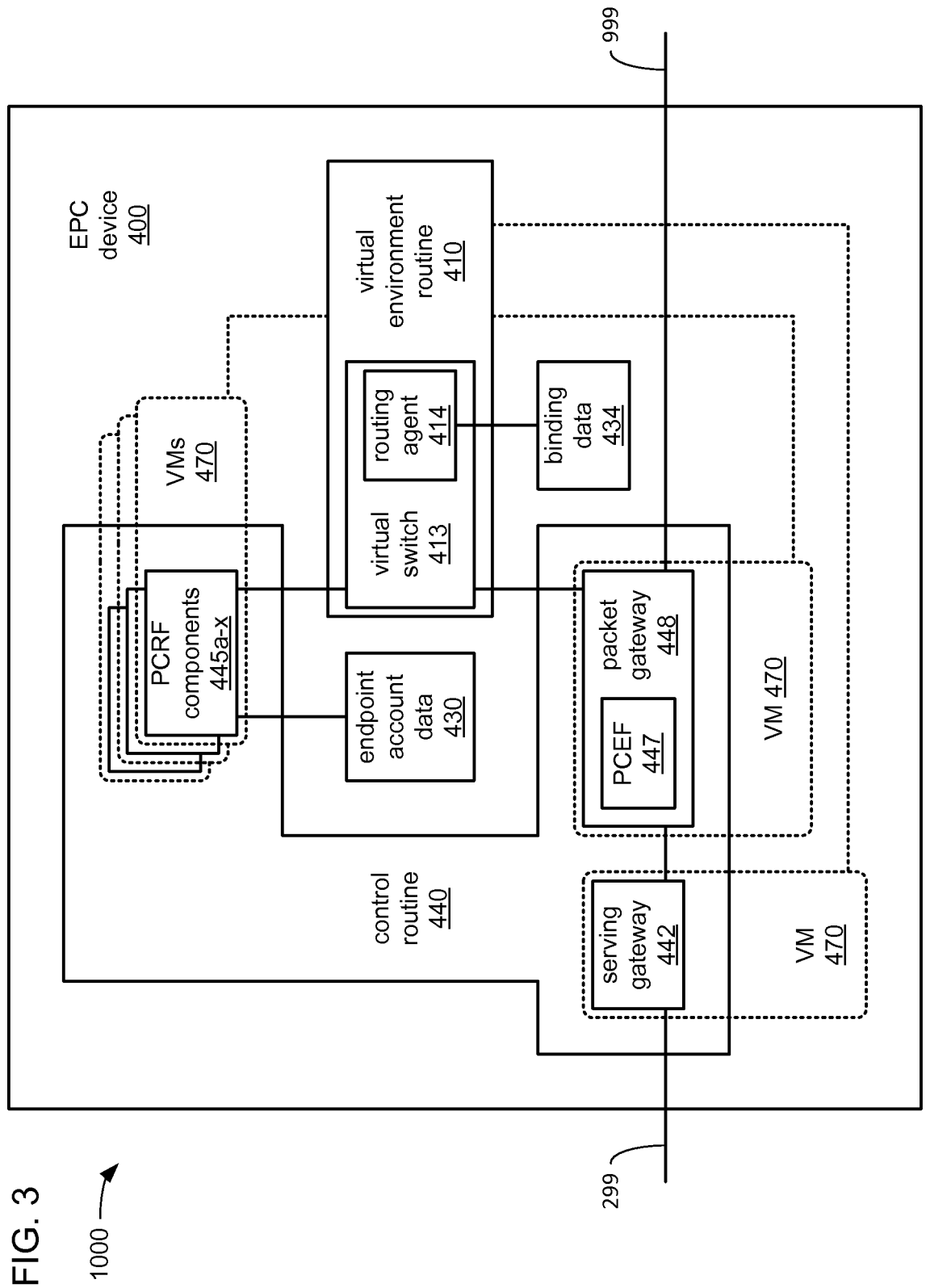
FIG. 3 illustrates an example embodiment of an EPC device.

The processor component 450 may be caused by execution of the virtual environment routine 410 to generate multiple VMs 470 within which various components of the control routine 440 may be separately executed by the processor component 450. Among those components of the control routine 440 may be components that control initiation, QoS, termination and/or other aspects of communications among the endpoint devices 100 and/or between the endpoint devices 100 and other devices (e.g., the network devices 800), through at least a portion of the wireless cellular network 199. FIG. 3 illustrates a block diagram of a portion of an embodiment of the wireless communications system 1000 of FIGS. 1 and 2 in greater detail. More specifically FIG. 3 depicts aspects of the operating environment of an example embodiment of the EPC device 400 in which the processor component 450, including aspects of the provision of separate VMs 470 for the execution of each of various components of the control routine 440 as a result of execution of the virtual environment routine 410.

More specifically, the control routine 440 may incorporate one or more components of the wireless communications system 1000 that cooperate to control the provision of communications services to the endpoint devices 100, including and not limited to, a serving gateway 442, a packet gateway 448, and a quantity of PCRF components labeled 445a through 445x. In turn, the packet gateway 448 may incorporate a Policy Charging and Enforcement Function (PCEF) component 447. Execution of the control routine 440 by the processor component 450 may entail the execution of one or more of the components 442, 445a-x, 447 and 448.

The virtual environment routine 410 may incorporate a virtual switch 413, which may in turn incorporate a routing agent 414. Upon executing the virtual environment routine 410, the processor component 450 may instantiate a separate VM 470 for the execution by the processor component 450 of each of the serving gateway 442 and the packet gateway 448, as well as for the execution of each of the PCRF components 445a-x. In contrast, execution of the virtual environment routine 410 by the processor component 450 may be executed outside any VM, and may be accompanied by additional access privileges that enable the virtual environment routine 410 to perform various hypervisor functions to monitor, support and/or control the provision of each of the VMs 470 and/or the execution of each of the components of the wireless communications system 1000 that is executed within one of the VMs 470. Execution of the virtual environment routine 410 to provide various hypervisor functions may entail execution of the virtual switch 413 and/or the routing agent 414, one or both of which may employ such additional access privileges in providing an analog to at least a physical network switch device coupled to the components 442, 445a-x, 447 and/or 448 of the control routine 440.

The serving gateway 442 may control operation of one or more base stations 200 to provide one or more of the cells 1200 making up the wireless cellular network 199. The serving gateway 442 may recurringly operate each base station 200 to determine which endpoint devices 100 are currently located within the coverage area of each of the cells 1200. The serving gateway 442, in cooperation with a mobile management entity (MME, not shown), may also track movement of endpoint devices 100 between cells 1200 and/or coordinate the associated handoff between the base stations 200 of cells 1200 that endpoint devices 100 move between. The serving gateway 442 may also receive requests from endpoint devices 100 (as relayed through the base stations 200) for communications services, including initiating and/or terminating a data session in which an endpoint device 100 may transmit and/or receive data. Such data may represent voice, still images, video, documents, etc. During such a data session, the serving gateway 442 may relay such data between a base station 200 with which an endpoint device 100 is wirelessly communicating and the packet gateway 448.

The packet gateway 448 may relay data packets that convey data associated with an endpoint device 100 to and from the serving gateway 442, and/or between the serving gateway 442 and the network 999, depending on what other device that endpoint device 100 in exchanges that data with during a data session. The packet gateway 448 may generate a packet conveying an indication of a request for communications services received from an endpoint device 100 to the virtual switch 413 to be relayed to one of the PCRF components 445a-x. If such a request for communications services is granted by one of the PCRF components 445a-x, then the packet gateway 448 may receive commands from that one of the PCRF components 445a-x to enable the provision of those communications services. In response, the packet gateway 448 may cooperate with the serving gateway 442 to route packets of data in a data session between that endpoint device 100 and the other device with which that endpoint device 100 is to communicate.

As the packet gateway 448 so cooperates with the serving gateway 442, the PCEF component 447 may receive commands from the same one of the PCRF components 445a-x to monitor and/or control various aspects of the data session in accordance with a policy that may be associated with that endpoint device 100 and/or the identity of a particular operator of that endpoint device 100. By way of example, there may be different rates of charging for communications services depending on the quantity and/or type of data exchanged in a data session, whether the other device with which the data is exchanged is within the same wireless cellular network 199 and/or within the same zone 1400, the current time of day and/or day of week, etc. The PCEF component 447 may monitor various aspects of the data that is exchanged, and convey indications of those aspects to that same one of the PCRF components 445a-x for use in determining an amount to charge. Also by way of example, there may be a specific limit associated with that endpoint device 100 and/or a particular operator of that endpoint device 100 on the type(s) and/or quantity of data that may be exchanged in a data session. By way of another example, there may be a specific limit on the data rate at which data may be exchanged in a data session (e.g., a specific level of QoS specified), and that limit may be dependent on whether the other device with which the data is exchanged is within the same wireless cellular network 199 and/or with the same zone 1400, the current time of day and/or day of week, etc. The PCEF component 447 may enforce one or more of such limits on the exchange of data.

Figure 4A:
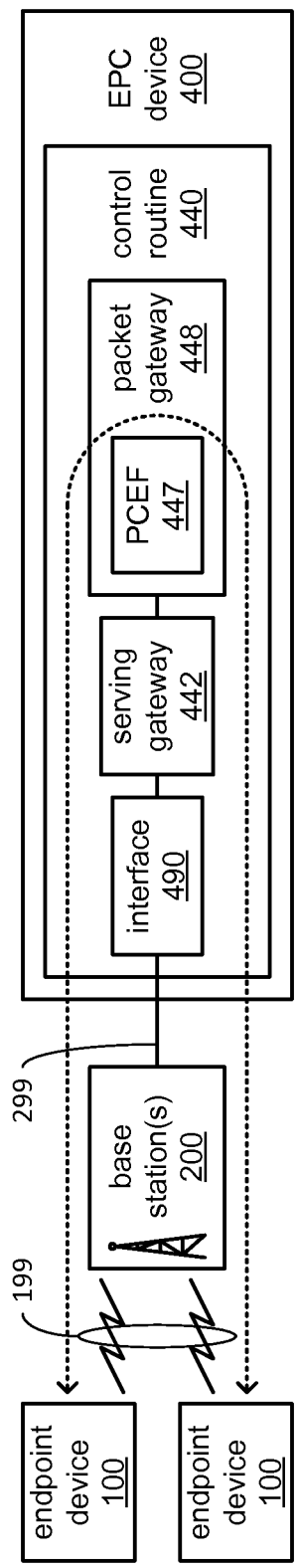
FIGS. 4A, 4B and 4C each illustrate an example embodiment of a flow of user data through a portion of a wireless communications system.
Figure 4B:
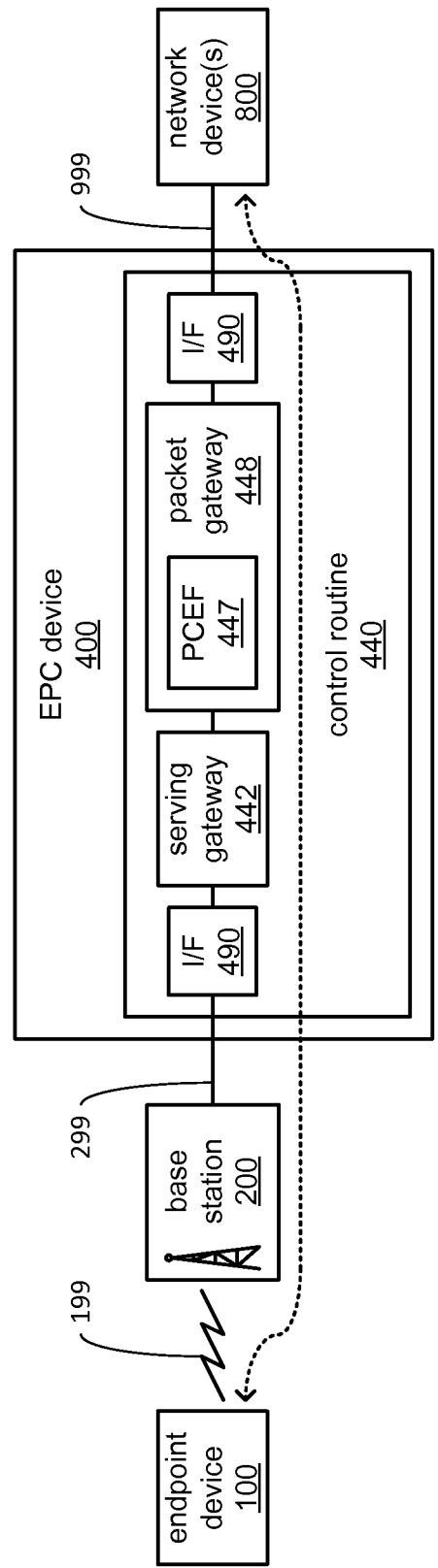
Figure 4C:
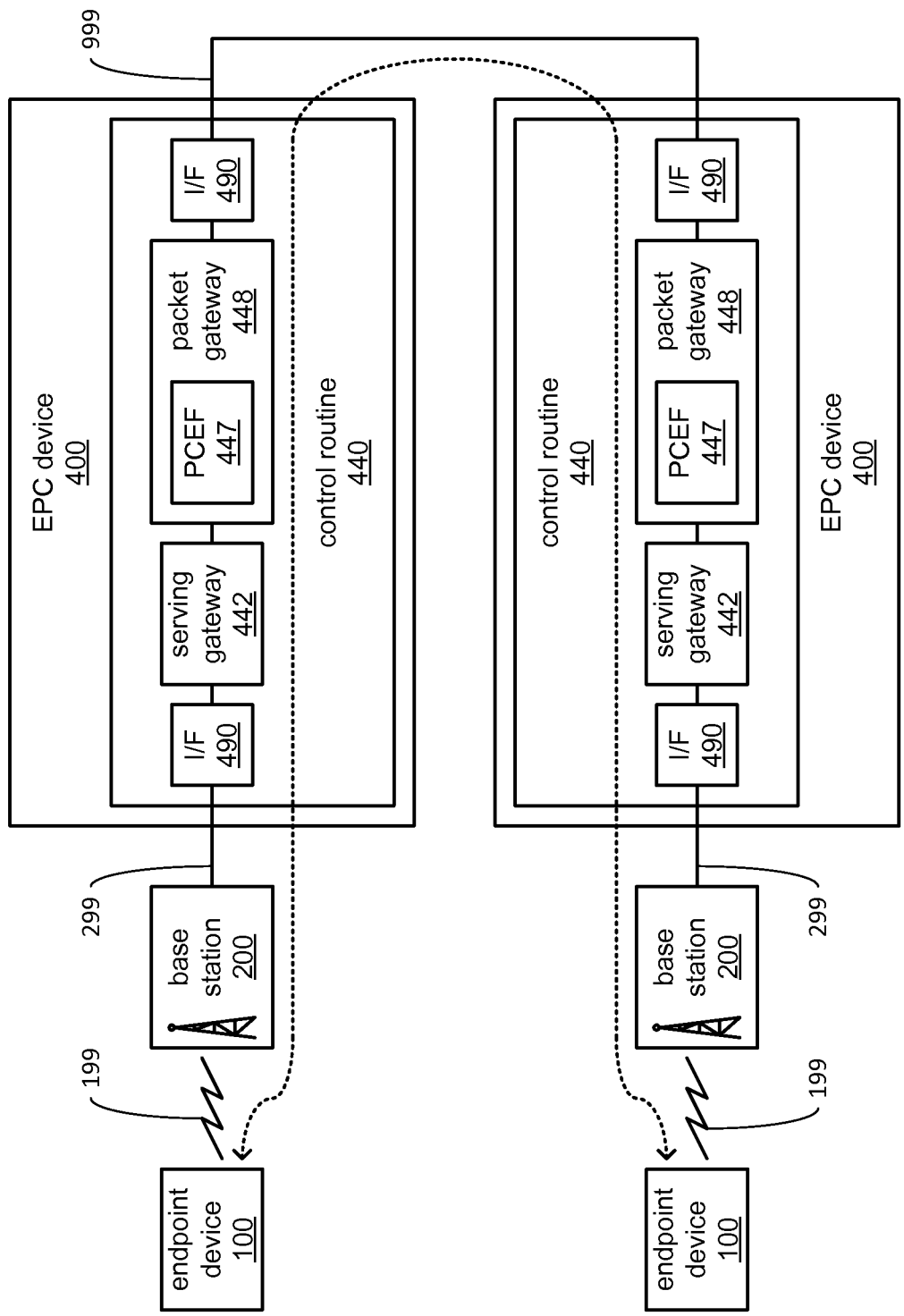

FIGS. 4A-C illustrate example embodiments of a flow of data packets conveying data in a data session that may be supported by cooperation between the serving gateway 442 and the packet gateway 448, as directed by one of the PCRF components 445a-x. As just described, depending on the nature of the policy on which charging for communications services is based, each of these flows of data may be associated with a different rate of charging (e.g., per unit of data and/or per amount of time used in exchanging data). As also just described, depending on the nature of the policy on which any limitations on the exchange of data may be based, each of these flows of data may be associated with different restrictions on amount of data that may be exchanged (e.g., a monthly cap on the amount of data that may be exchanged) and/or on a rate at which data may be exchanged (e.g., a specified level of QoS that may include a specification of a maximum data rate).

FIG. 4A depicts an example of a flow of data packets conveying user data between two endpoint devices 100 that are either within the same cell 1200 or are within cells 1200 of the same zone 1400 such that both endpoint devices 100 may communicate with the same EPC device 400 through either the same base station 200 or different base stations 200 that are coupled to that same EPC device 400. The same serving gateway 442 may operate the same interface 490 to both receive and transmit data between the packet gateway 448 and each of the endpoint devices 100. As the flow of each data packet reaches the packet gateway 448 from one of the endpoint devices 100 and is transmitted back towards the other, the PCEF component 447 may monitor and/or impose a specified limit on the flow of data (e.g., a specified QoS) as directed by one of the PCRF components 445a-x.

FIG. 4B depicts an example of a flow of data packets conveying user data between an endpoint device 100 within the wireless cellular network 199 and a network device 800 coupled to the network 999. The serving gateway 442 may operate one of the interfaces 490 to exchange the data with the endpoint device 100 and the packet gateway 448 may operate another of the interfaces 490 to exchange the data with the network device 800. As the flow of each data packet reaches the packet gateway 448 from one of the endpoint device 100 or the network device 800, and progresses towards the other, the PCEF component 447 may monitor and/or impose a specified limit on the flow of data as directed by one of the PCRF components 445a-x.

FIG. 4C depicts an example of a flow of data packets conveying user data between two endpoint devices 100 that are coupled to different EPC devices 400 such that the data must be exchanged therebetween through the network 999. Within each of the depicted EPC devices 400, the serving gateway 442 may operate one of the interfaces 490 to exchange the data with the endpoint device 100 and the packet gateway 448 may operate another of the interfaces 490 to exchange the data with the other of these two EPC devices 400 through the network 999. As the flow of each data packet passes through the packet gateway 448 within each of these depicted EPC devices 400, the PCEF component 447 within each may monitor and/or impose a limit on the flow of data as directed by one of the PCRF components 445a-x.

Returning to FIG. 3, each of the PCRF components 445a-x may employ an indication of a device ID received from one of the endpoint devices 100 requesting communications services to retrieve from the endpoint account data 430 indications of various parameters of available communications services that may be associated with that endpoint device 100 and/or the identity of an operator of that endpoint device 100. More specifically, the endpoint account data 430 may include, for each of multiple device IDs of multiple ones of the endpoint devices 100, indications of what communications services may be available, along with indications of policies for charging for the use of each of those communications services and/or indications of policies of limitations on such use (e.g., a specified maximum level of QoS). Again, each of the PCRF components 445a-x may provide commands to the PCEF component 447 to enact one or more of such policies.

The virtual switch 413, in cooperation with the routing agent 414, may examine the header and/or payload of each packet received from at least the packet gateway 448 to determine whether that packet is to be routed towards one of the PCRF components 445a-x, and if so, may select that one of the of the PCRF components 445a-x based on a load balancing scheme and/or a binding of one or more data sessions to that one of the PCRF components 445a-x. More specifically, the virtual switch 413 may inspect the header of a received packet to determine whether the packet is of a particular type employed at least by the packet gateway 448 to convey control messages adhering to a particular protocol (e.g., the Diameter protocol). If not, then the virtual switch 413 may route that packet to another component of the wireless communications system 1000 that may be executed within a VM 470 without inspecting the contents of the payload of that packet. However, if the packet is of that particular type, then the routing agent 414 may examine at least a portion of the payload of that packet to identify the type of control message that is conveyed within the packet, an identifier of a data session associated with the packet and/or an identifier of one of the endpoint devices 100, and may route that packet to one of the PCRF components 445a-x based at least on those contents.

Figure 5A:
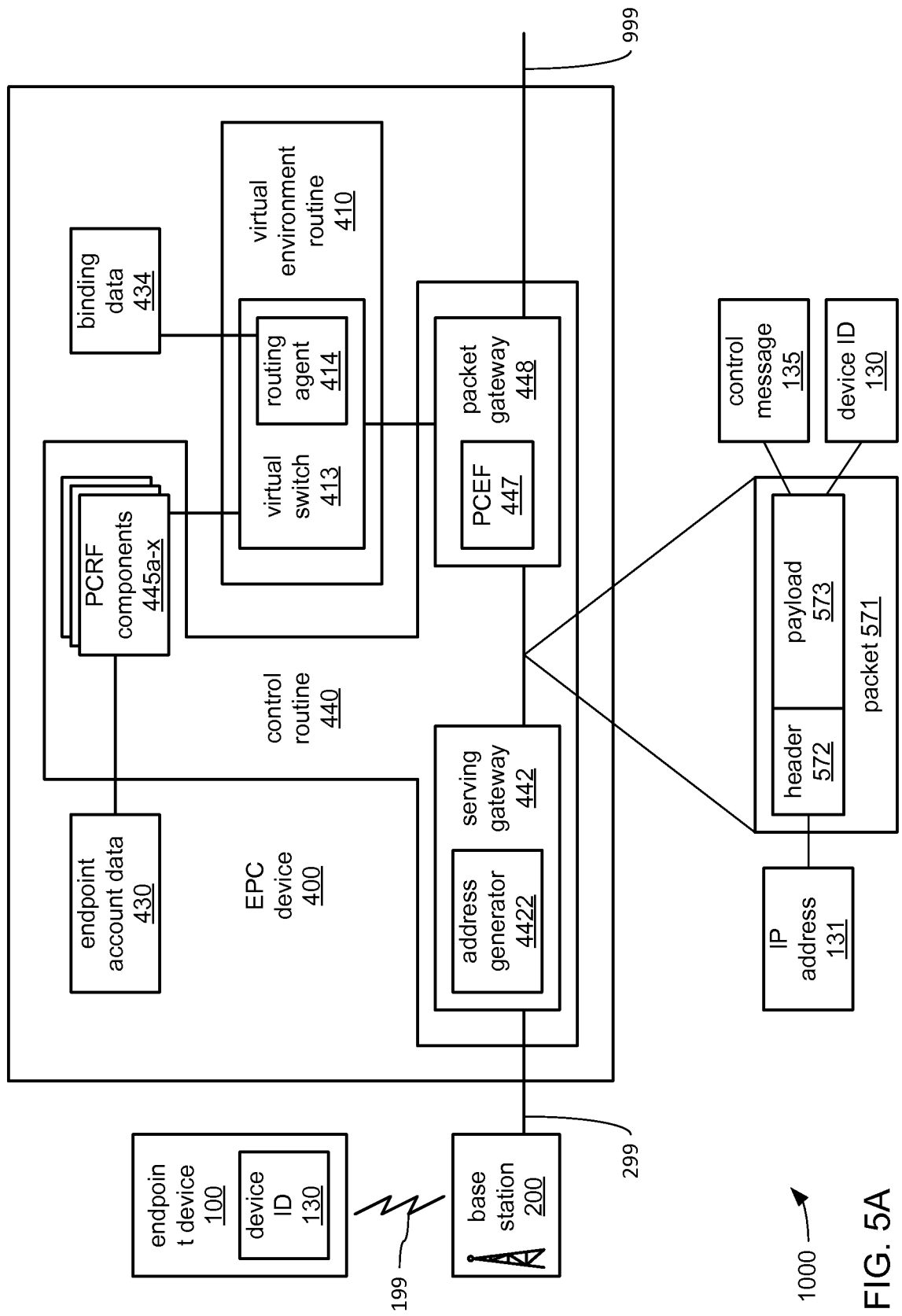
FIGS. 5A and 5B, together, illustrate an example embodiment of routing a packet conveying a control message.
Figure 5B:
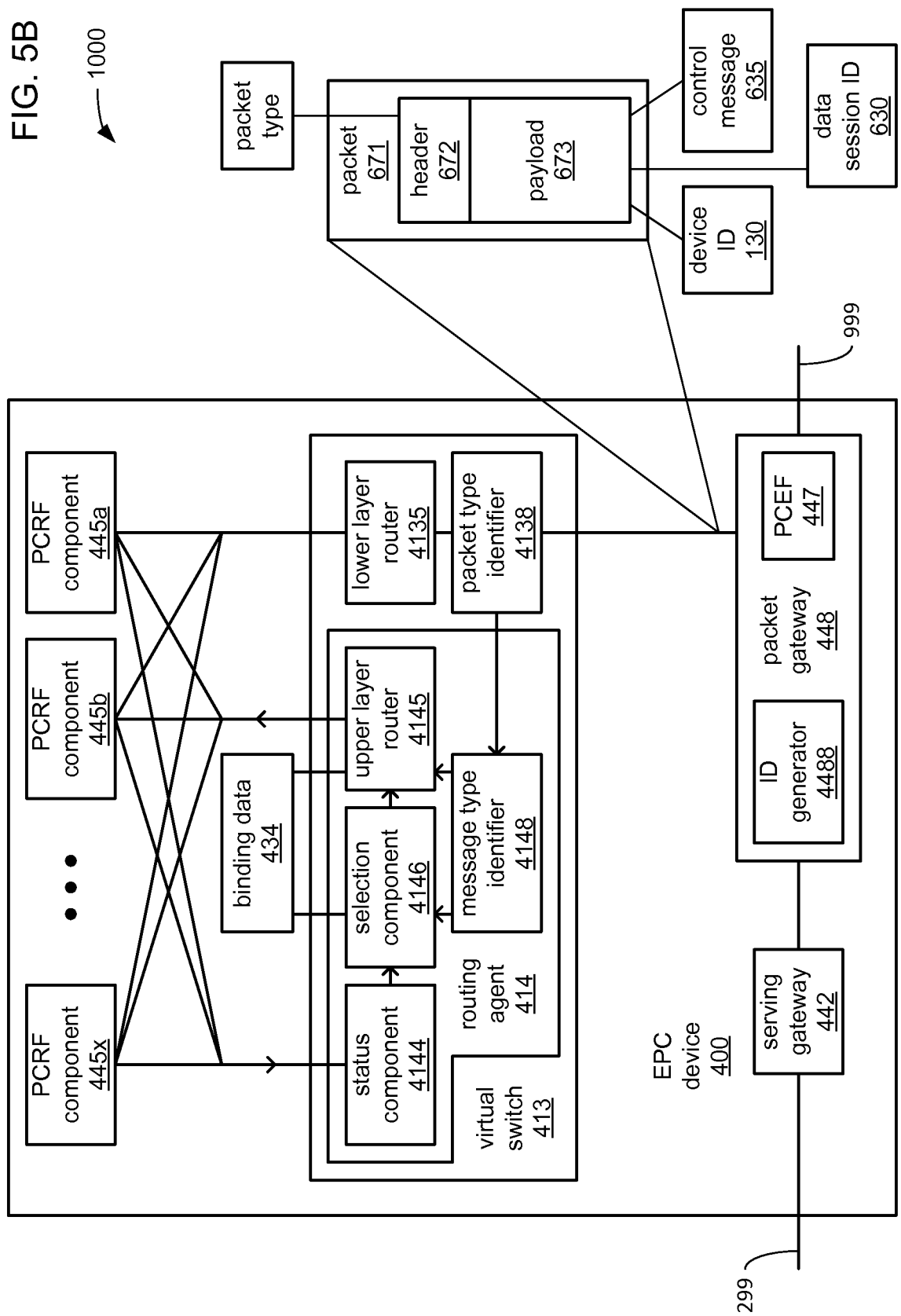

FIGS. 5A-B, together, illustrate an example embodiment of identifying and routing packets conveying such control messages to selected ones of the multiple PCRF components 445a-x in more detail. FIG. 5A depicts aspects of a packet that may be exchanged between the serving gateway 442 and the packet gateway 448, where the packet may or may not convey a control message such that the packet is to be routed to one of the PCRF components 445a-x. FIG. 5B depicts aspects of routing a packet received from the packet gateway 448 to one of the multiple PCRF components 445a-x.

Turning to FIG. 5A, the serving gateway 442 may exchange a wide variety of pieces of data in a data session (e.g., voice, images, documents, etc.) and control messages (e.g., indications of status, requests for services and/or responses thereto, etc.) with an endpoint device 100 via a portion of the wireless cellular network 199, a base station 200 and the base station network 299. In response to receiving either data or a control message from the endpoint device 100, the serving gateway 442 may generate a packet 571 that includes a header 572 and a payload 573 for use in conveying the data or the control message to the packet gateway 448 to be acted upon by the packet gateway 448 and/or relayed by the packet gateway 448 elsewhere.

The data or control message received from the endpoint device 100 may be accompanied by a device ID 130 that may be uniquely assigned to the endpoint device 100 at the time of its manufacture or at the time it is configured for use with the wireless cellular network 199. In generating the header 572, an identifier generator 4422 may generate an IP address 131 that the serving gateway 442 may assign to all packets 571 used to convey data and/or control messages received from that particular endpoint device 100. Thus, in effect, the identifier generator 4422 may assign an IP address to the endpoint device 100. In various embodiments, the IP address 131 may remain associated with that particular endpoint device 100 until that endpoint device 100 is no longer detected by the serving gateway 442 within the wireless cellular network 199 and/or until the endpoint device 100 ceases to engage in communications on the wireless cellular network 199 for a predetermined period of time.

In some embodiments, where the packet 571 is generated to convey data received from the endpoint device 100 in the payload 573 to the packet gateway 448 for routing onward to another endpoint device 100 or to a network device 800 that must be reached through the network 999, the IP address 131 may be used by the packet gateway 448 as an identifier of the source of the data in relaying the data onward by transmitting it in another packet onto the network 999. Thus, the IP address 131 may be used to identify the endpoint device 100 on the Internet.

However, where the packet 571 is generated to convey a control message 135 to the packet gateway 448, the payload 573 may contain the control message 135 and the device ID 130. In some embodiments where the packet 571 is generated to convey a control message, the IP address 131 may be included in the header 572 to enable the packet gateway 448 to distinguish packets associated with one endpoint device 100 from packets associated with other endpoint devices 100 by the IP address 131 in the header 572, instead of requiring the packet gateway 448 to retrieve the device ID 130 from the payload 573. The packet 571 may be generated and/or conveyed to the packet gateway 448 in accordance with a particular protocol intended for packets conveying control messages. In some embodiments, the protocol so used may be the Stream Control Transmission Protocol (SCTP) promulgated by IETF for use in conveying control messages related to controlling the exchange of data.

Turning to FIG. 5B, upon receiving the packet 571 conveying the control message 135 (and regardless of the exact protocol employed in conveying the control message 135 to the packet gateway 448), the packet gateway 448 may generate a corresponding packet 671 to convey a corresponding control message 635 to the virtual switch 413 to be processed and/or relayed to another component within the EPC device 400 (e.g., one of the PCRF components 445a-x). As will be explained in greater detail, the control message 635 may convey an indication to one of the PCRF components 445a-x of the control message 135 having been received by the packet gateway 448 from an endpoint device 100. The packet gateway 448 may generate the packet 671 to conform to a particular protocol (e.g., the Diameter protocol) for conveying the control message 635 providing an indication of the control message 135 having been received from the endpoint device 100. Indeed, the packet gateway 448 may generate the packet 671 to so conform to a particular protocol as a mechanism to indicate to the virtual switch 413 that what is conveyed in the packet 671 is a control message, rather than data or still other types of content which the packet gateway 448 may provide to the virtual switch 413 in packets that do not conform to that particular protocol. In some embodiments, the protocol employed in conveying the control message 135 to the packet gateway 448 may be different than the protocol to be employed in conveying the control message 635 to the virtual switch 413. By way of example, while the protocol that may be employed by the packet gateway 448 in conveying the control message 635 to the virtual switch 413 may be the Diameter protocol, the protocol by which the control message 135 to the packet gateway 448 may be a different protocol.

As depicted, the packet 671 may incorporate a header 672 and a payload 673. The header 672 may include an indication of a packet type of the packet 671. By way of example, where packet 671 is generated to conform to a particular protocol (e.g., the Diameter protocol), the header 672 may include an indication in one or more bits of a bit field of the packet 671 so conforming to that protocol. Not unlike the payload 573 of the packet 571, the payload 673 of the packet 671 may include at least the device ID 130 in addition to the control message 635. In generating the packet 673 to convey the control message 635 to the virtual switch 413, the packet gateway 448 may include an IP address of the packet gateway 448 in the header 672, and not the IP address 130 of the endpoint devices 100 from which the control message 135 was received that caused the packet 673 to be generated (the identity of that endpoint device 100 is already conveyed by the device ID 130 included in the payload 673).

In some embodiments, the payload 673 may also include a data session ID 630, that uniquely identifies the data session that the control message 135 conveyed in the packet 571 and the control message 635 conveyed in the packet 671 are associated with. As previously discussed, in some embodiments, an endpoint device may be engaged in exchanging data in multiple data sessions that are ongoing at the same time. In such embodiments, it may be that different types of data are exchanged in separate data sessions. Thus, for example, if an endpoint device is operated to engage in both voice communications (e.g., voice over Internet Protocol, or VOIP) and the exchange of a portion of a website (e.g., a download of a webpage), the data representing voice(s) in the voice communications may be exchanged in a separate data session than the data representing the portion of the website. An identifier generator 4488 of the packet gateway 448 may generate a unique data session ID 630 for each data session, and may include that data session ID in the payload 673 of each packet 671 that conveys a control message 635 associated with that data session.

Upon receipt of the packet 671, a packet type identifier 4138 of the virtual switch 413 may analyze the header 672 to identify the type of packet. Again, the packet gateway 448 may generate the packet 671 to adhere to a particular protocol to provide the virtual switch 413 with an indication that what is conveyed in the packet 671 is a control message. The fact of the packet 671 having been created to adhere to that particular protocol to convey a control message (e.g., the control message 635) to the virtual switch 413 may be reflected in the indication of packet type in the header 672. Thus, if the packet type identifier 4138 finds no indication of the packet 671 being of a packet type generated to conform to the particular protocol used by the packet gateway 448 to convey a control message, then the packet type identifier 4138 may deem the packet 671 to be of a different type that may be routed based on an indication of a destination in the header 672. As a result, the packet type identifier 4138 may refrain from analyzing any portion of the payload 673 (which may add to the amount of time required to route the packet 671), and a lower layer router 4135 of the routing agent 4435 may so route the packet 671 based on an indication of a destination for the packet 671 in the header 672 (e.g., an IP address) in a manner consistent with routing at Layer 3 of the OSI model. It should be noted that one or more other types of packets to convey data and/or other information that may not be associated with controlling the provision of communications services may be exchanged through the virtual switch 413 among various components of the cellular communications network 1000 that are executed within the EPC device 400. Such other types of packets may be generated to include an IP address or other indication in the header of one of those components as the destination, and it may be deemed appropriate for the virtual switch 413 to employ such an indication in the header of those packets to route those packets as just described.

However, if the packet type identifier 4138 does find an indication of the packet 671 being of a packet type generated to conform to the particular protocol used by the packet gateway 448 to convey a control message, then a message type identifier 4148 of the routing agent 414 may examine the control message 635 conveyed within the payload 673 to determine what is the type of the control message 635. By way of example, the control message 635 may include an indication of the packet gateway 448 having received a corresponding control message 135 requesting initiation of a data session for one of the endpoint devices 100, requesting updating of an aspect of an ongoing data session, or requesting termination of an ongoing data session. However, depending on at least the particular protocol used (e.g., the Diameter protocol), there may be other types of control messages in addition to and/or in lieu of these three examples.

If the message type identifier 4148 determines that the control message 635 includes an indication of a request to initiate a data session for one of the endpoint devices 100 (e.g., a Diameter "initiate transaction" message), then a selection component 4146 of the routing agent 414 may retrieve the device ID 130 of that one of the endpoint devices 100 and/or the data session ID 630 of the data session associated with the request from the payload 673. The selection component 4146 may then use the device ID 130, the data session ID 630 and/or one or more load balancing rules to select one of the PCRF components 445a through 445x to be the PCRF component to which the packet 671 is to be routed for a determination of whether to grant the requested data session and/or with what restrictions. Once the selection is made, an upper layer router 4145 of the routing agent 414 may then route the packet 673 to the selected one of the PCRF components 445a-x. Also, once the selection is made, the selection component 4146 may store within the binding data 434 an indication of which one of the PCRF components 445a-x is now correlated to the device ID 130 and/or the data session ID 630.

FIG. 6A depicts an example of the manner in which indications of such correlations of each of the PCRF components 445a-x to the device IDs 130 of multiple ones of the endpoint devices 100 and/or to the data session IDs 630 of multiple data sessions may be stored in the binding data 434. As depicted, in some embodiments, the binding data 434 may include an entry for each of the PCRF components 445a-x in which the device IDs 130 of the endpoint devices 100 correlated with that PCRF component 445a-x may be stored. When one of the PCRF components 445a-x is selected by the selection component 4146 to receive a packet 671 conveying an indication of receipt of a request (e.g., the control message 135) to initiate a data session for a particular one of the client devices 100, the entry for that selected one of the PCRF components 445a-x may be augmented with the device ID 130 of that particular one of the client devices 100. The addition of that device ID 130 to that entry may serve as an indication that the selected one of the PCRF components 445a-x associated with that entry is to receive one or more subsequent packets 671 conveying other control messages 635 associated with at least that data session if the request to initiate that data session is granted. Thus, as previously discussed, the load balancing among the PCRF components 445a-x performed by the selection component 4146 may not be simply for the handling of the one packet 671 conveying the indication of a request for initiation of that data session, but may also be for the handling of subsequent packets 671 conveying other control messages 635 conveying other indications associated with that same data session. Further, it may be that such an indication of a correlation between that device ID 130 and the selected one of the PCRF components 445a-x also results in the routing to the selected one of the PCRF components 445a-x of still other packets 671 conveying control messages associated with other data sessions that are also associated with that same one of the client devices 100. Stated differently, such an indication of a correlation between a particular one of the PCRF components 445a-x and a particular device ID 130 of a particular one of the endpoint devices 100 may serve to bind all data sessions associated with that one of the endpoint devices 100 to that selected one of the PCRF components 445a-x such that all packets conveying control messages concerning any of those data sessions are routed to that selected one of the PCRF components 445a-x.

As also depicted in FIG. 6A, the binding data 434 may additionally include a configuration data 435. The configuration data 435 may include indications of one or more load balancing rules that may be employed by the selection component 4146 in selecting one of the PCRF components 445a-x to become bound, as just described, to receiving and processing what may become multiple packets 671 conveying control messages 635 concerning data session(s) associated with a particular endpoint device 100 (as identified by its device ID 130). In some embodiments, such load balancing rules may direct the selection component 4146 to employ a relatively simple round-robin approach to selecting PCRF components 445a-x. In other embodiments, such load balancing rules may direct the selection component 4146 to take into account the number of device IDs 130 already indicated in the binding data 434 as correlated to each of the PCRF components 445a-x. Stated differently, the selection component 4146 may be caused to take into account how many of the endpoint devices 100 (as identified by their device IDs 130) may have data sessions that are already bound to each of the PCRF components 445a-x, and to balance that quantity of bindings of data sessions associated with endpoint devices 100 among the PCRF components 445a-x.

In still other embodiments, such load balancing rules may direct the selection component 4146 to take into account the amount of activity of each of the PCRF components 445a-x in handling packets 671 conveying control messages 635 arising from the bindings already made to each of the PCRF components 445a-x. This may be in recognition of the manner in which each data session may differ from others in terms of the number of control messages 635 that may be associated with each such that one of the PCRF components 445a-x may be subjected to a greater amount of activity than another of the PCRF components 445a-x even as both are associated with the same quantity of bindings to data sessions. In such embodiments, and referring momentarily back to FIG. 5B, a status component 4144 of the routing agent 414 may exchange packets on a recurring basis with each of the PCRF components 445a-x to recurringly receive indications of status from each. More specifically, the status component 4144 may recurringly receive packets from each of the PCRF components 445*a-x* indicating the amount of activity that each is engaged in as a result of handling packets 671 conveying control messages 635.

It should be noted that, in some embodiments, the load balancing rules may include allocations of ranges of device IDs 130 to particular sets of the PCRF components 445*a-x* such that load balancing for a particular device ID 130 may occur among a subset of the PCRF components 445*a-x* that are allocated a range of device IDs 130 that include the particular device ID 130. This may be done in relatively large embodiments of the communications control system 1000 that support the operation of a relatively large embodiment of the wireless cellular network 199 such that there may be a relatively large quantity of endpoint devices 100. In such situations, the quantity of account data associated with each of the endpoint devices 100 may be sufficiently large that it is deemed desirable to divide that account data into portions associated with different ranges of device IDs 130, and to make each of those portions accessible to different subsets of the PCRF components 445*a-x*.

Regardless of the exact manner in which load balancing and/or other considerations may cause the data sessions of a particular endpoint device 100 to be bound to a particular one of the PCRF components 445*a-x*, in some embodiments, such bindings may be given a persistent or "sticky" characteristic. Stated differently, it may be that once a data session of a particular endpoint device 100 has been bound to a particular one of the PCRF components 445*a-x*, any future data sessions associated with that same endpoint device 100 may also be bound to that same one of the PCRF components 445*a-x*, even after a lengthy period of inactivity on the part of that particular endpoint device 100 in which there are no data sessions associated with that particular endpoint device 100. This may be another approach taken to manage a relatively large quantity of account data associated with a relatively large quantity of endpoint devices 100.

As previously discussed, some embodiments of the wireless communications system 1000 may support the engagement of each of the endpoint devices 100 in more than one data session through the wireless cellular network 199. Again, communications associated with the exchange of each of different types of data may each be deemed to be communications associated with a different data session. Thus, for example, an endpoint device 100 engaging in a combination of voice communications carried out at the same time as an exchange of data of a spreadsheet may be deemed to be a situation in which there are two simultaneously occurring data sessions engaged in by that one endpoint device 100. As also previously discussed, in such embodiments, the packet gateway 448 (or another component executed within the EPC device 400) may assign a unique data session ID 630 to each such data session, and those data session IDs 630 may be retrieved from the payload 673 and used along with device IDs 130 in routing packets to different ones of the PCRF components 445*a-x*. Stated differently, bindings involving the PCRF components 445*a-x* may be determined on a per data session basis in addition to or in lieu of a basis of per endpoint device 100.

In such other embodiments, and as depicted in FIG. 6B, the entries for each of the PCRF components 445*a-x* may include indications of correlations to both device IDs 130 associated with each of the endpoint devices 100 and data session IDs 630 associated with the one or more data sessions associated with each of those endpoint devices 100. Regardless of the exact manner in which one of the PCRF components 445*a-x* is selected to receive the packet 671 in which the control message 635 indicates the reception of a request to initiate a data session (e.g., the control message 135 received from the endpoint device 100), and referring momentarily back to FIG. 3, that one of the PCRF components 445*a-x* may retrieve account from the endpoint account data 430 information associated with the endpoint device 100 that is associated with that control message 635 and/or with an operator of that endpoint device 100 to determine whether or not to grant that request. By way of example, the account associated with that endpoint device 100 may be past due in payments for the provision of communications services to that endpoint device 100 such that the selected one of the PCRF components 445*a-x* determines that the request should not be granted. However, if the data session that is requested to be initiated is for an emergency call to authorities (e.g., to summon aid from police, an ambulance service or a fire department), then the selected one of the PCRF components 445*a-x* may grant the request in spite of the past due situation as part of a policy of not blocking voice calls for emergency services. Returning to FIG. 5B, regardless of the basis on which a request to initiate a data session is granted, such granting may result in the selected one of the PCRF components 445*a-x* conveying a packet through the virtual switch 413 to the packet gateway 448 to so initiate the data session, and a packet through the virtual switch 413 to the PCEF component 447 to enforce one or more restrictions on that data session, as previously discussed.

However, if the message type identifier 4148 determines that the control message 635 includes an indication of a request to update an aspect of a current data session (e.g., the control message 635 includes a Diameter "update transaction" message) associated with a particular one of the endpoint devices 100, then the upper layer router 4145 may retrieve from the binding data 434 an indication of which one of the PCRF components 445*a-x* is already bound to handle packets conveying control messages 635 associated with that particular data session and/or for all data sessions associated with that particular one of the endpoint devices 100. The upper layer router 4145 may then route the packet 671 to the one of the PCRF components 445*a-x* that is indicated in the binding data 434 to be so bound. In so referring to the binding data 434 to retrieve indications of correlations therefrom, the upper layer router 4145 may enforce the bindings earlier created by the selection component 4146. In various embodiments, a request to update an aspect of a current data session may be used to provide an indication to one of the PCRF components 445*a-x* of any of a variety of changes in a current data session, including and not limited to, which cell 1200 an endpoint device 100 has moved to, how long a data session has been underway, how much data has been exchanged during a data session, etc.

Alternatively, if the message type identifier 4148 determines that the control message 635 includes an indication of a receipt of a request to terminate a current data session (e.g., the control message 635 includes a Diameter "terminate transaction" message) associated with a particular one of the endpoint devices 100, then the upper layer router 4145 may retrieve from the binding data 434 an indication of which one of the PCRF components 445*a-x* is already bound to handle packets conveying control messages for that particular data session and/or for all data sessions associated with that particular one of the endpoint devices 100. In some embodiments, the upper layer router 4145 may then route the packet 671 to the one of the PCRF components 445*a-x* that is indicated in the binding data 434 to be so bound, and may also remove the indication of the binding from the binding data 434. However, in other embodiments, termination of a data session may not require further action by one of the PCRF components 445a-x, and the upper layer router 4145 may refrain from relaying the packet 671 to any of the PCRF components 445a-x as the upper layer router 4145 removes the indication of the binding from the binding data 434.

Returning to FIGS. 1 and 2, more generally, each of the devices 100, 400 and 800 may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a smart card incorporating a processor component, a body-worn computing device incorporated into clothing, a computing device integrated into a vehicle (e.g., a car, a bicycle, a wheelchair, etc.), a server, a cluster of servers, a server farm, etc.

Each of the virtual environment routine 410 and the control routine 440 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processor component 450. Where one or more device drivers are included, those device drivers may provide support for any of a variety of other components, whether hardware or software components, of the EPC device 400.

Also more generally, each of the networks 299 and 999 may be a single network possibly limited to extending within a single building or other relatively limited area, a combination of connected networks possibly extending a considerable distance, and/or may include the Internet. Thus, each of the networks 299 and 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the processor component 450 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, the storage 460 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, at least a portion of the interface(s) 490 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 7A:
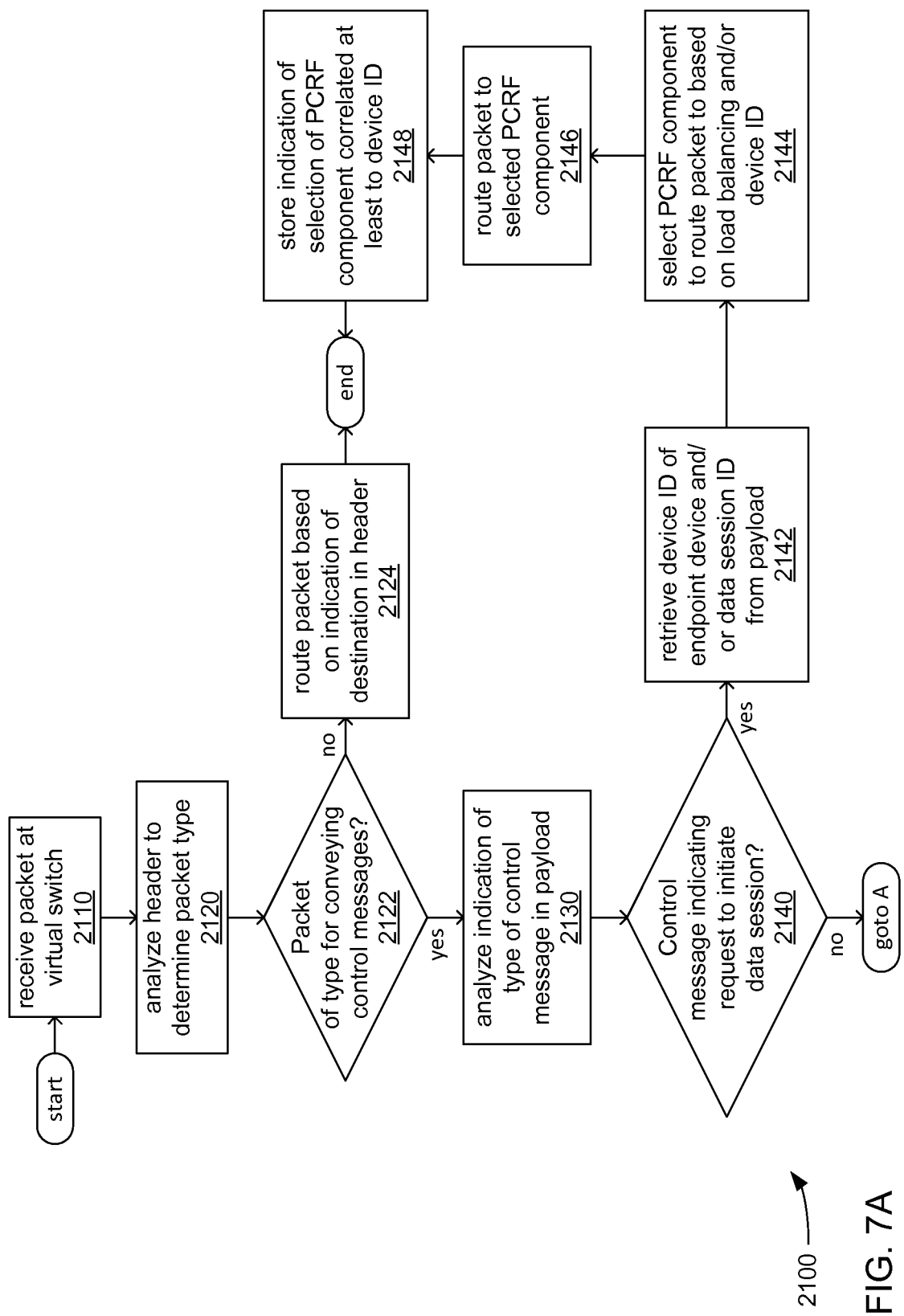
FIGS. 7A and 7B, together, illustrates a logic flow according to an embodiment.
Figure 7B:
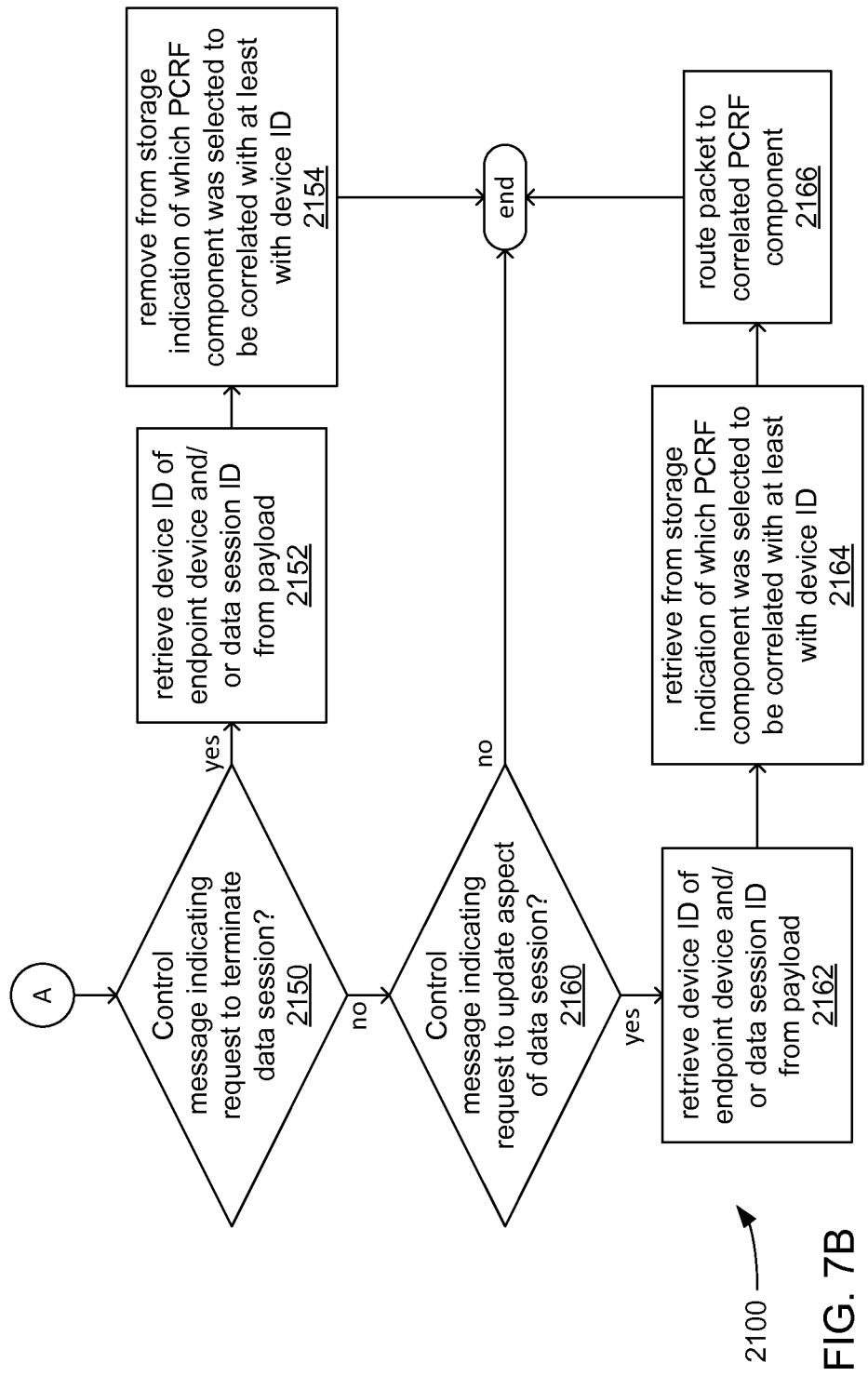

FIGS. 7A and 7B, together, illustrate an embodiment of a logic flow 2100. The logic flow 2100 may be representative of some or all of the operations executed by one or more embodiments described herein. More specifically, the logic flow 2100 may illustrate operations performed by the processor component 450 in executing at least the control routine 440, and/or performed by other component(s) of the EPC device 400. In particular, the logic flow 2100 is focused on operations to route packets in greater detail.

At 2110, a virtual switch executed by a processor component of an EPC device (e.g., the virtual switch 413 executed by the processor component 450 of the EPC device 400) receives a packet (e.g., the packet 671). As previously discussed, the packet may be generated by a packet gateway executed by the processor component within a VM (e.g., the packet gateway 448 executed within one of the VMs 470).

At 2120, the processor component, in executing the virtual switch, may analyze the header of the packet (e.g., the header 672) to determine its packet type. As previously discussed, the packet may be generated during execution of the packet gateway to conform to the specification of a particular protocol (e.g., the Diameter protocol) if the packet is generated to convey a control message concerning the provision of a data session to one or more endpoint devices (e.g., the control message 635 concerning providing a data session to one or more of the endpoint devices 100) to the virtual switch. As part of generating the packet to so conform to that particular protocol, the header of the packet may include an indication of the packet having been generated to conform to that particular protocol. Alternatively, the packet may be generated during execution of the packet gateway to not conform to that protocol if the packet is generated to convey data and/or other content in its payload that does not include such a control message.

At 2122, if the packet is not of a packet type conforming to the particular protocol for conveying such control messages, then the processor component, in executing the virtual switch, may route the packet at 2124 based on an indication of its destination in its header. As has been discussed, such an indication in the header may be an IP address, and as has been discussed, such routing of the packet may be regarded as routing at Layer 3 of the OSI model of network activity.

However, if at 2122, the packet is of a packet type conforming to that particular protocol, then the processor component, in executing a routing agent incorporated into the virtual switch (e.g., the routing agent 414), may analyze an indication of the type of control message conveyed within the payload of the packet (e.g., the control message 635 within the payload 673) at 2130. As has been discussed, such examination of the contents of the payload as part of routing the packet may be regarded as routing at Layer 7 of the OSI model of network activity.

At 2140, if the control message indicates reception of a request for the initiation of a data session (e.g., reception of a control message 135 from one of the endpoint devices 100 requesting initiation of a data session), then the processor component may retrieve the device ID of that endpoint device (e.g., a device ID 130) from the payload of the packet at 2142 as part of executing the routing agent. As has also been discussed, in some embodiments, the processor component may also retrieve from the payload a data session ID (e.g., a data session ID 630) that may have been assigned by the packet gateway to the data session that may be initiated if the request for initiation of communications services is granted.

At 2144, the processor component may employ the device ID, the data session ID and one or more load balancing rules in executing the routing agent to select one of multiple PCRF components that are each also executed by the processor component in a separate VM (e.g., the PCRF components 445a-x). Again, the load balancing rules may include selecting one of the multiple PCRF components based on relative levels of activity, relative quantities of data sessions already bound to each based on device IDs and/or data session IDs, etc.

At 2146, the processor component may route the packet to the selected one of the PCRF components. At 2148, the processor component may store, as part of a binding data in a storage of the EPC device, an indication of which one of the PCRF components is now correlated to the device ID for at least the data session that may be initiated if the request to initiate communications services is granted. Again, in some embodiments, the data session ID assigned by the packet gateway may be stored along with the device ID to enable correlation of subsequent packets with the particular data session ID as well as with the particular device ID.

However, if at 2140, the control message does not indicate reception of a request for initiation of a data session, then at 2150, if the control message indicates reception of a request for termination of an ongoing data session (e.g., reception of a control message 135 from one of the endpoint devices 100 requesting termination of a data session), then the processor component may retrieve the device ID of the endpoint device associated with the ongoing data session from the payload of the packet at 2152 as part of executing the routing agent. Again, as also discussed, the processor component may also retrieve the data session ID associated with that ongoing data session from the payload. At 2154, the processor component may remove from the storage (e.g., from the binding data) the indication of which one of the PCRF components is correlated to the device ID for at least the ongoing data session that may be specifically requested to be terminated.

However, if at 2150, the control message also does not indicate reception of a request for termination of an ongoing data session, then the control message may incorporate an indication of a request to update an aspect of an ongoing data session. The processor component may retrieve the device ID of the endpoint device associated with the ongoing data session from the payload of the packet as part of executing the routing agent. Again, the processor component may also retrieve the data session ID of that ongoing data session from the payload. At 2164, the processor component may retrieve from the storage the indication of which one of the PCRF components is correlated to the device ID for at least the ongoing data session that may be specifically requested to be updated (e.g., may be specified by the data session ID). At 2166, the processor component may route the packet to that one of the PCRF components.

Figure 8:
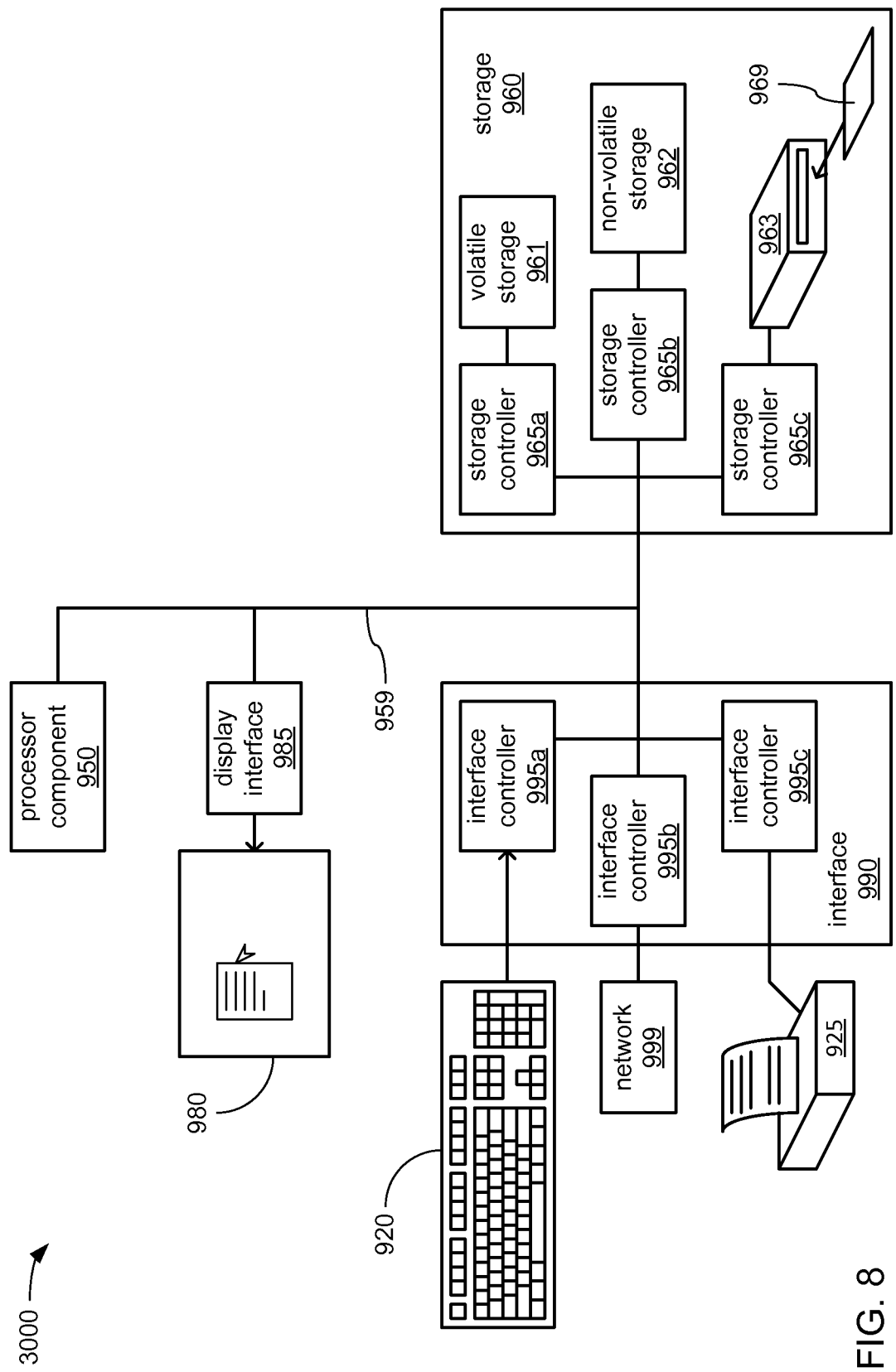
FIG. 8 illustrates a processing architecture according to an embodiment.

FIG. 8 illustrates an embodiment of an exemplary processing architecture 3000 suitable for implementing various embodiments as previously described. More specifically, the processing architecture 3000 (or variants thereof) may be implemented as part of one or more of the computing devices 100, 400 or 800. It should be noted that components of the processing architecture 3000 are given reference numbers in which the last two digits correspond to the last two digits of reference numbers of at least some of the components earlier depicted and described as part of the computing devices 100, 400 and 800. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (which may correspond to the processor component 450) may include any of a wide variety of commercially available processors, employing any of a wide variety of technologies and implemented with one or more cores physically combined in any of a number of ways.

As previously discussed, the storage 960 (which may correspond to the storage 460) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to the interface(s) 490) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). More specifically, the interface controller 995b may incorporate one or more radio frequency (RF) transceivers and/or may be coupled to one or more antennae 991 (which may be incorporated into a portion of the interface 990) to exchange RF wireless signals with antenna(e) of one or more other devices as part of wireless communications on the depicted network 999. The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus includes a processor component; an interface to couple the processor component to a wireless cellular network; a virtual switch to retrieve a device identifier of an endpoint device from a payload of a packet and to select a policy charging and rules function (PCRF) component to which to route the packet based at least on the device identifier, the endpoint device coupled to the wireless cellular network; and the selected PCRF component to grant a data session to the endpoint device based on an indication of a request by the endpoint device for the data session conveyed in the payload, the data session including an exchange of data between the endpoint device and the interface device through the wireless cellular network.

In Example 2, which includes the subject matter of Example 1, the apparatus may include a virtual environment component to provide a multitude of virtual machines (VMs); and a multitude of PCRF components, where each PCRF component of a multitude of PCRF components may be executed within one of the VMs of the multitude of VMs, and the multitude of PCRF components may include the PCRF component.

In Example 3, which includes the subject matter of any of Examples 1-2, the virtual switch may route packets among the multiple VMs to enable at least a subset of the VMs to access the interface.

In Example 4, which includes the subject matter of any of Examples 1-3, the virtual switch may analyze a header of the packet to determine whether the packet is of a packet type to convey a control message in the payload, condition the retrieval of the device identifier on the determination of packet type, and select a component of a wireless communications system to which to route the packet based on an indication of a destination in the header based on the determination of packet type, the selected component executed within a VM of the multitude of VMs, and the control message may include at least one of the indication of the request for the data session, an indication of a request to update an aspect of the data session or a request to terminate the data session.

In Example 5, which includes the subject matter of any of Examples 1-4, the indication of a destination may include an Internet Protocol (IP) address.

In Example 6, which includes the subject matter of any of Examples 1-5, the aspect may include which cell of multiple cells of the wireless cellular network the endpoint device is moved to.

In Example 7, which includes the subject matter of any of Examples 1-6, the apparatus may include a policy charging and enforcement function (PCEF) component to enforce a policy on the data session, the virtual switch may retrieve account data associated with the device ID to determine a status of the account associated with the device ID, and to condition the grant of the data session on the determination of status of the account, and to configure the PCEF component to enforce the policy, the policy associated with the account.

In Example 8, which includes the subject matter of any of Examples 1-7, the data session may include an exchange of data between the endpoint device and another device through the interface, and the policy may include at least one of a rate of charging based on a quantity of data exchanged through the data session, a rate of charging based on a type of data exchanged through the data session, a rate of charging based on whether the other device is directly coupled to the wireless cellular network, or a specified quality of service (QoS) that includes a specified maximum rate of exchange of data through the data session.

In Example 9, which includes the subject matter of any of Examples 1-8, the virtual switch may select the PCRF component to which to route the packet based on a load balancing rule and the device identifier; and the load balancing rule may include at least one of balancing the binding of data sessions among a multitude of PCRF components or balancing the binding of endpoint devices among the multitude of PCRF components, the multitude of PCRF components including the PCRF component.

In Example 10, which includes the subject matter of any of Examples 1-9, the virtual switch may retrieve another device identifier from another payload of another packet, and may select the PCRF component to which to route the other packet based at least on the other device identifier matching the device identifier of the endpoint device to bind at least the data session to the PCRF component.

In Example 11, which includes the subject matter of any of Examples 1-10, the data session may be assigned a data session identifier, and the virtual switch may retrieve another data session identifier from another payload of another packet, and may select the PCRF component to which to route the other packet based at least on the other data session identifier matching the data session identifier of the data session to bind the data session to the PCRF component.

In Example 12, which includes the subject matter of any of Examples 1-11, the apparatus may include a packet gateway to generate the packet to conform to the Diameter protocol and to provide the packet to the virtual switch in response to receipt of the request for the data session via the interface.

In Example 13, which includes the subject matter of any of Examples 1-12, the apparatus may include a serving gateway to track movement of the endpoint device among multiple cells of the wireless cellular network through the interface.

In Example 14, a computing-implemented method includes retrieving, at a virtual switch of an evolved packet core (EPC) device, a device identifier of an endpoint device from a payload of a packet, the EPC device and the endpoint device coupled to a wireless cellular network; selecting, at the virtual switch, a policy charging and rules function (PCRF) component of the EPC device to which to route the packet based at least on the device identifier; and granting, at the selected PCRF component, a data session to the endpoint device based on an indication of a request by the endpoint device for the data session conveyed in the payload, the data session including an exchange of data between the endpoint device and the EPC device through the wireless cellular network.

In Example 15, which includes the subject matter of Example 14, the method may include analyzing, at the virtual switch, a header of the packet to determine whether the packet is of a packet type to convey a control message in the payload, the control message including the indication of the request for the data session; conditioning the retrieving of the device identifier on the determination of packet type; and selecting, at the virtual switch and based on the determination of packet type, a component of a wireless communications system within the EPC device to which to route the packet based on an indication of a destination in the header.

In Example 16, which includes the subject matter of any of Examples 14-15, the indication of a destination may include an Internet Protocol (IP) address.

In Example 17, which includes the subject matter of any of Examples 14-16, the aspect may include which cell of multiple cells of the wireless cellular network the endpoint device is moved to.

In Example 18, which includes the subject matter of any of Examples 14-17, the method may include retrieving, at the selected PCRF component, account data associated with the device ID to determine a status of an account associated with the device ID; conditioning the granting of the data session on the determination of status of the account; and configuring a policy charging and enforcement function (PCEF) component of the EPC device to enforce a policy associated with the account on the data session.

In Example 19, which includes the subject matter of any of Examples 14-18, the data session may include an exchange of data between the endpoint device and another device through the EPC device, and the policy may include at least one of a rate of charging based on a quantity of data exchanged through the data session, a rate of charging based on a type of data exchanged through the data session, a rate of charging based on whether the other device is directly coupled to the wireless cellular network, or a specified quality of service (QoS) that includes a specified maximum rate of exchange of data through the data session.

In Example 20, which includes the subject matter of any of Examples 14-19, the method may include selecting the PCRF component to which to route the packet based on a load balancing rule and the device identifier; the load balancing rule including at least one of balancing the binding of data sessions among a multitude of PCRF components within the EPC device or balancing the binding of endpoint devices among the multitude of PCRF components, and the multitude of PCRF components including the PCRF component.

In Example 21, which includes the subject matter of any of Examples 14-20, the method may include retrieving, at the virtual switch, another device identifier from another payload of another packet; and selecting, at the virtual switch, the PCRF component to which to route the other packet based at least on the other device identifier matching the device identifier of the endpoint device to bind at least the data session to the PCRF component.

In Example 22, which includes the subject matter of any of Examples 14-21, the data session assigned a data session identifier, the method may include retrieving, at the virtual switch, another data session identifier from another payload of another packet; and selecting, at the virtual switch, the PCRF component to which to route the other packet based at least on the other data session identifier matching the data session identifier of the data session to bind the data session to the PCRF component.

In Example 23, which includes the subject matter of any of Examples 14-22, the method may include providing a multitude of virtual machines (VMs) within the EPC device; executing each PCRF component of a multitude of PCRF components within one of the VMs of the multitude of VMs, the multitude of PCRF components including the PCRF component; and executing the virtual switch to route packets among the multiple VMs to enable at least a subset of the VMs to access an interface of the EPC device that is coupled to the wireless cellular network.

In Example 24, which includes the subject matter of any of Examples 14-23, the method may include executing the virtual switch to enable at least the subset of the VMs to access another interface of the EPC device that is coupled to the Internet.

In Example 25, which includes the subject matter of any of Examples 14-24, the method may include generating the packet to conform to the Diameter protocol in response to receipt by the EPC of the request for the data session from the endpoint device.

In Example 26, at least one tangible machine-readable storage medium includes instructions that when executed by a processor component, may cause the processor component to retrieve, at a virtual switch of an evolved packet core (EPC) device, a device identifier of an endpoint device from a payload of a packet, the EPC device and the endpoint device coupled to a wireless cellular network; select, at the virtual switch, a policy charging and rules function (PCRF) component of the EPC device to which to route the packet based at least on the device identifier; and grant, at the selected PCRF component, a data session to the endpoint device based on an indication of a request by the endpoint device for the data session conveyed in the payload, the data session including an exchange of data between the endpoint device and the EPC device through the wireless cellular network.

In Example 27, which includes the subject matter of Example 26, the processor component may be caused to analyze, at the virtual switch, a header of the packet to determine whether the packet is of a packet type to convey a control message in the payload, the control message including the indication of the request for the data session; condition the retrieval of the device identifier on the determination of packet type; and select, at the virtual switch and based on the determination of packet type, a component of a wireless communications system within the EPC device to which to route the packet based on an indication of a destination in the header.

In Example 28, which includes the subject matter of any of Examples 26-27, the indication of a destination may include an Internet Protocol (IP) address.

In Example 29, which includes the subject matter of any of Examples 26-28, the aspect may include which cell of multiple cells of the wireless cellular network the endpoint device is moved to.

In Example 30, which includes the subject matter of any of Examples 26-29, the processor component may be caused to retrieve, at the selected PCRF component, account data associated with the device ID to determine a status of an account associated with the device ID; condition the grant of the data session on the determination of status of the account; and configure a policy charging and enforcement function (PCEF) component of the EPC device to enforce a policy associated with the account on the data session.

In Example 31, which includes the subject matter of any of Examples 26-30, the data session may include an exchange of data between the endpoint device and another device through the EPC device, and the policy may include at least one of a rate of charging based on a quantity of data exchanged through the data session, a rate of charging based on a type of data exchanged through the data session, a rate of charging based on whether the other device is directly coupled to the wireless cellular network, or a specified quality of service (QoS) that includes a specified maximum rate of exchange of data through the data session.

In Example 32, which includes the subject matter of any of Examples 26-31, the processor component may be caused to select the PCRF component to which to route the packet based on a load balancing rule and the device identifier; where the load balancing rule may include at least one of balancing the binding of data sessions among a multitude of PCRF components within the EPC device or balancing the binding of endpoint devices among the multitude of PCRF components, the multitude of PCRF components including the PCRF component.

In Example 33, which includes the subject matter of any of Examples 26-32, the processor component may be caused to retrieve, at the virtual switch, another device identifier from another payload of another packet; and select, at the virtual switch, the PCRF component to which to route the other packet based at least on the other device identifier matching the device identifier of the endpoint device to bind at least the data session to the PCRF component.

In Example 34, which includes the subject matter of any of Examples 26-33, the data session assigned a data session identifier, and the processor component may be caused to retrieve, at the virtual switch, another data session identifier from another payload of another packet; and select, at the virtual switch, the PCRF component to which to route the other packet based at least on the other data session identifier matching the data session identifier of the data session to bind the data session to the PCRF component.

In Example 35, which includes the subject matter of any of Examples 26-34, the processor component may be caused to provide a multitude of virtual machines (VMs) within the EPC device; execute each PCRF component of a multitude of PCRF components within one of the VMs of the multitude of VMs, the multitude of PCRF components including the PCRF component; and execute the virtual switch to route packets among the multiple VMs to enable at least a subset of the VMs to access an interface of the EPC device that is coupled to the wireless cellular network.

In Example 36, which includes the subject matter of any of Examples 26-35, the processor component may be caused to execute the virtual switch to enable at least the subset of the VMs to access another interface of the EPC device that is coupled to the Internet.

In Example 37, which includes the subject matter of any of Examples 26-36, the processor component may be caused to generate the packet to conform to the Diameter protocol in response to receipt by the EPC of the request for the data session from the endpoint device.

In Example 38, an apparatus includes a processor component; an interface to couple the processor component to a wireless cellular network; a virtual switch to retrieve a device identifier of an endpoint device from a payload of a packet and to select a policy charging and rules function (PCRF) component to which to route the packet based at least on the device identifier matching another device identifier retrieved from another payload of another packet, the endpoint device coupled to the wireless cellular network; and the selected PCRF component to update an aspect of a data session based on a indication of a request to update the aspect of the data session conveyed in the payload, the data session including an exchange of data between the endpoint device and the interface device through the wireless cellular network.

In Example 39, which includes the subject matter of Example 38, the apparatus may include a serving gateway to track movement of the endpoint device among multiple cells of the wireless cellular network through the interface.

In Example 40, which includes the subject matter of any of Examples 38-39, the apparatus may include a packet gateway may generate the packet and may provide the packet to the virtual switch in response to receipt of the request to update an aspect of the data session, the aspect including a movement of the endpoint device from one cell of the multiple cells to another cell of the multiple cells.

In Example 41, which includes the subject matter of any of Examples 38-40, the apparatus may include a virtual environment component to provide a multitude of virtual machines (VMs); and a multitude of PCRF components, each PCRF component of a multitude of PCRF components executed within one of the VMs of the multitude of VMs, and the multitude of PCRF components including the PCRF component.

In Example 42, which includes the subject matter of any of Examples 38-41, the virtual switch may route packets among the multiple VMs to enable at least a subset of the VMs to access the interface.

In Example 43, which includes the subject matter of any of Examples 38-42, the virtual switch may analyze a header of the packet to determine whether the packet is of a packet type to convey a control message in the payload, condition the retrieval of the device identifier on the determination of packet type, and select a component of a wireless communications system to which to route the packet based on an indication of a destination in the header based on the determination of packet type, the selected component executed within a VM of the multitude of VMs, and the control message including at least one of the indication of the request for the data session, an indication of a request to update an aspect of the data session or a request to terminate the data session.

In Example 44, which includes the subject matter of any of Examples 38-43, the indication of a destination may include an Internet Protocol (IP) address.

In Example 45, which includes the subject matter of any of Examples 38-44, the aspect may include which cell of multiple cells of the wireless cellular network the endpoint device is moved to.

In Example 46, at least one tangible machine-readable storage medium may include instructions that when executed by a processor component, cause the processor component to perform any of the above.

In Example 47, an apparatus may include means for performing any of the above.

The invention claimed is:

1. An apparatus to control wireless communications comprising:
 a processor component;
 an interface to couple the processor component to a wireless network; and
 a virtual switch to:
  analyze a header of a packet to determine whether the packet is a packet type to convey a control message in a payload of the packet, the control message corresponding to a request received from an endpoint device and comprising at least one of an indication of the request for a data session, an indication of a request to update an aspect of the data session or a request to terminate the data session, responsive to a determination that the packet is not the packet type to convey a control message in the payload, route the packet based on an indication of a destination in the header, responsive to a determination that the packet is the packet type to convey a control message in the payload, retrieve a device identifier of the endpoint device from the payload of the packet and select a policy charging and rules function (PCRF) component to which to route the packet based at least on the device identifier of the endpoint device coupled to the wireless network; and the selected PCRF component to grant the data session to the endpoint device based on an indication of the request by the endpoint device for the data session conveyed in the payload, the data session comprising an exchange of data between the endpoint device and the interface through the wireless network.

2. The apparatus of claim 1, comprising
a virtual environment component to provide a multitude of virtual machines (VMs); and
a multitude of PCRF components, each PCRF component of a multitude of PCRF components executed within one of the VMs of the multitude of VMs, and the multitude of PCRF components comprising the PCRF component.

3. The apparatus of claim 2, the virtual switch to select a component of a wireless communications system to which to route the packet based on the indication of a destination in the header based on the determination of packet type, the selected component executed within a VM of the multitude of VMs.

4. The apparatus of claim 1, comprising a policy charging and enforcement function (PCEF) component to enforce a policy on the data session, the virtual switch to retrieve account data associated with the device ID to determine a status of the account associated with the device ID, to condition the grant of the data session on the determination of status of the account, and to configure the PCEF component to enforce the policy, the policy associated with the account.

5. The apparatus of claim 4, the data session comprising an exchange of data between the endpoint device and another device through the interface, and the policy comprising at least one of a rate of charging based on a quantity of data exchanged through the data session, a rate of charging based on a type of data exchanged through the data session, a rate of charging based on whether the other device is directly coupled to the wireless network, or a specified quality of service (QoS) that comprises a specified maximum rate of exchange of data through the data session.

6. The apparatus of claim 1, the virtual switch to retrieve another device identifier from another payload of another packet, and to select the PCRF component to which to route the other packet based at least on the other device identifier matching the device identifier of the endpoint device to bind at least the data session to the PCRF component.

7. A computer-implemented method for controlling wireless communications comprising:
analyzing, at a virtual switch, a header of a packet to determine whether the packet is of a packet type to convey a control message in a payload of the packet, the control message corresponding to a request received from an endpoint device and comprising an indication of a request for a data session, an indication of a request to update an aspect of the data session or a request to terminate the data session;

routing, responsive to a determination that the packet is not the packet type to convey a control message in the payload, the packet based on an indication of a destination in the header;

retrieving, at the virtual switch of an evolved packet core (EPC) device responsive to a determination that the packet is the packet type to convey a control message in the payload, a device identifier of the endpoint device from the payload of the packet, the EPC device and the endpoint device coupled to a wireless network;

selecting, at the virtual switch, a policy charging and rules function (PCRF) component of the EPC device to which to route the packet based at least on the device identifier; and granting, at the selected PCRF component, a data session to the endpoint device based on the indication of the request by the endpoint device for the data session conveyed in the payload, the data session comprising an exchange of data between the endpoint device and the EPC device through the wireless network.

8. The computer-implemented method of claim 7, the method comprising
selecting, at the virtual switch and based on the determination of packet type, a component of a wireless communications system within the EPC device to which to route the packet based on an indication of a destination in the header.

9. The computer-implemented method of claim 7, the method comprising:
retrieving, at the selected PCRF component, account data associated with the device ID to determine a status of an account associated with the device ID;
conditioning the granting of the data session on the determination of status of the account; and
configuring a policy charging and enforcement function (PCEF) component of the EPC device to enforce a policy associated with the account on the data session.

10. The computer-implemented method of claim 9, the data session comprising an exchange of data between the endpoint device and another device through the EPC device, and the policy comprising at least one of a rate of charging based on a quantity of data exchanged through the data session, a rate of charging based on a type of data exchanged through the data session, a rate of charging based on whether the other device is directly coupled to the wireless network, or a specified quality of service (QoS) that comprises a specified maximum rate of exchange of data through the data session.

11. The computer-implemented method of claim 7, the method comprising selecting the PCRF component to which to route the packet based on a load balancing rule and the device identifier; the load balancing rule comprising at least one of balancing the binding of data sessions among a multitude of PCRF components within the EPC device or balancing the binding of endpoint devices among the multitude of PCRF components, the multitude of PCRF components comprising the PCRF component.

12. The computer-implemented method of claim 7, the data session assigned a data session identifier, the method comprising:
retrieving, at the virtual switch, another data session identifier from another payload of another packet; and
selecting, at the virtual switch, the PCRF component to which to route the other packet based at least on the other data session identifier matching the data session identifier of the data session to bind the data session to the PCRF component.

13. The computer-implemented method of claim 7, the method comprising:
providing a multitude of virtual machines (VMs) within the EPC device;
executing each PCRF component of a multitude of PCRF components within one of the VMs of the multitude of VMs, the multitude of PCRF components comprising the PCRF component; and
executing the virtual switch to route packets among the multitude VMs to enable at least a subset of the VMs to access an interface of the EPC device that is coupled to the wireless network.

14. An apparatus to control wireless communications comprising:
a processor component;
an interface to couple the processor component to a wireless network; and
a virtual switch to:
analyze a header of a packet to determine whether the packet is a packet type to convey a control message in a payload of the packet, the control message corresponding to a request received from an endpoint device and comprising at least one of an indication of the request for a data session, an indication of a request to update an aspect of the data session or a request to terminate the data session,
responsive to a determination that the packet is not the packet type to convey a control message in the payload, route the packet based on an indication of a destination in the header,
responsive to a determination that the packet is the packet type to convey a control message in the payload, retrieve a device identifier of the endpoint device from the payload of the packet and select a policy charging and rules function (PCRF) component to which to route the packet based at least on the device identifier matching another device identifier retrieved from another payload of another packet, the endpoint device coupled to the wireless network; and
the selected PCRF component to update an aspect of the data session based on an indication of a request to update the aspect of the data session conveyed in the payload, the data session comprising an exchange of data between the endpoint device and the interface through the wireless network.

15. The apparatus of claim 14, comprising a serving gateway to track movement of the endpoint device among multiple cells of the wireless network through the interface.

16. The apparatus of claim 15, comprising a packet gateway to generate the packet and to provide the packet to the virtual switch in response to receipt of the request to update an aspect of the data session, the aspect comprising a movement of the endpoint device from one cell of the multiple cells to another cell of the multiple cells.

17. The apparatus of claim 14, comprising
a virtual environment component to provide a multitude of virtual machines (VMs); and
a multitude of PCRF components, each PCRF component of a multitude of PCRF components executed within one of the VMs of the multitude of VMs, and the multitude of PCRF components comprising the PCRF component.

18. The apparatus of claim 17, the virtual switch to route packets among the multitude VMs to enable at least a subset of the VMs to access the interface.

19. At least one non-transitory machine-readable storage medium comprising instructions that when executed by a processor component, cause the processor component to:
analyze, at a virtual switch, a header of a packet to determine whether the packet is of a packet type to convey a control message in a payload of the packet, the control message corresponding to a request received from an endpoint device and comprising an indication of a request for a data session, an indication of a request to update an aspect of the data session or a request to terminate the data session;
route, responsive to a determination that the packet is not the packet type to convey a control message in the payload, the packet based on an indication of a destination in the header;
retrieve, at the virtual switch of an evolved packet core (EPC) device responsive to a determination that the packet is the packet type to convey a control message in the payload, a device identifier of the endpoint device from the payload of the packet, the EPC device and the endpoint device coupled to a wireless network;
select, at the virtual switch, a policy charging and rules function (PCRF) component of the EPC device to which to route the packet based at least on the device identifier; and
grant, at the selected PCRF component, a data session to the endpoint device based on the indication of the request by the endpoint device for the data session conveyed in the payload, the data session comprising an exchange of data between the endpoint device and the EPC device through the wireless network.

20. The at least one non-transitory machine-readable storage medium of claim 19, the processor component caused to select, at the virtual switch and based on the determination of packet type, a component of a wireless communications system within the EPC device to which to route the packet based on an indication of a destination in the header.

21. The at least one non-transitory machine-readable storage medium of claim 20, the aspect comprising which cell of multiple cells of the wireless network the endpoint device is moved to.

22. The at least one non-transitory machine-readable storage medium of claim 19, the processor component caused to select the PCRF component to which to route the packet based on a load balancing rule and the device identifier; the load balancing rule comprising at least one of balancing binding of data sessions among a multitude of PCRF components within the EPC device or balancing binding of endpoint devices among the multitude of PCRF components, the multitude of PCRF components comprising the PCRF component.

23. The at least one non-transitory machine-readable storage medium of claim 19, the processor component caused to:
retrieve, at the virtual switch, another device identifier from another payload of another packet; and
select, at the virtual switch, the PCRF component to which to route the other packet based at least on the other device identifier matching the device identifier of the endpoint device to bind at least the data session to the PCRF component.

24. The at least one non-transitory machine-readable storage medium of claim 19, the processor component caused to:
provide a multitude of virtual machines (VMs) within the EPC device;
execute each PCRF component of a multitude of PCRF components within one of the VMs of the multitude of VMs, the multitude of PCRF components comprising the PCRF component; and
execute the virtual switch to route packets among the multitude VMs to enable at least a subset of the VMs to access an interface of the EPC device that is coupled to the wireless network.

25. The at least one non-transitory machine-readable storage medium of claim 19, the processor component caused to generate the packet to conform to the Diameter protocol in response to receipt by the EPC of the request for the data session from the endpoint device.

\* \* \* \* \*